(12) United States Patent
Takashima et al.

(10) Patent No.: US 7,349,320 B2
(45) Date of Patent: Mar. 25, 2008

(54) APPARATUS FOR SWITCHING MODES BASED ON QUANTITY OF LIGHT RECEIVED IN FIRST SECTION OF A PHOTODETECTOR SECTION AND FIRST PLUS SECOND SECTION FOR CONTROLLING A LASER DIODE OUTPUT

(75) Inventors: Makoto Takashima, Ikoma (JP); Hideki Aikoh, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

(21) Appl. No.: 11/059,700

(22) Filed: Feb. 17, 2005

(65) Prior Publication Data

US 2005/0180297 A1  Aug. 18, 2005

(30) Foreign Application Priority Data

Feb. 17, 2004 (JP) ............................. 2004-039399

(51) Int. Cl.
*G11B 7/125* (2006.01)
(52) U.S. Cl. ..................................... 369/116; 369/47.5
(58) Field of Classification Search ................ 369/116, 369/47.5
See application file for complete search history.

(56) References Cited

U.S. PATENT DOCUMENTS

| | | | | |
|---|---|---|---|---|
| 5,838,652 A | * | 11/1998 | Kishita | 369/112.03 |
| 6,275,461 B1 | * | 8/2001 | Yoo et al. | 369/112.01 |
| 6,411,588 B1 | * | 6/2002 | Kase et al. | 369/112.02 |
| 2003/0053393 A1 | | 3/2003 | Shimano et al. | |
| 2003/0214897 A1 | | 11/2003 | Yoo et al. | |

FOREIGN PATENT DOCUMENTS

| | | |
|---|---|---|
| EP | 0 881 633 | 12/1998 |
| JP | 57-154657 | 9/1982 |

(Continued)

*Primary Examiner*—Gautam R. Patel
(74) *Attorney, Agent, or Firm*—Wenderoth, Lind & Ponack, L.L.P.

(57) ABSTRACT

An optical-disk drive device is provided which is capable of executing recording or reproduction at a plurality of numerical apertures and keeping constant the quantity of light which is emitted by a light-emitting element. This optical-disk drive device includes: light-emitting elements; a beam splitter which allows a luminous flux that is emitted by each of these light-emitting elements to branch off to a first luminous flux and a second luminous flux; a photo-detector which detects a front light that has branched off at the beam splitter; an aperture restriction member; and a controller which controls the quantity of light that is emitted by each of the light-emitting elements, using a signal which is obtained by the photo-detector, in which the photo-detector has a circular first detection area in which an inner luminous flux of the first luminous flux is received, and a ring-shaped second detection area in which an outer luminous flux of the first luminous flux is received; and the controller controls the quantity of light, at the time of a large numerical aperture, based on the quantity of light which is received in the first detection area and the second detection area, and controls the quantity of light, at the time of a small numerical aperture, based on the quantity of light which is received in the first detection area.

16 Claims, 16 Drawing Sheets

FOREIGN PATENT DOCUMENTS

| | | |
|---|---|---|
| JP | 5-342615 | 12/1993 |
| JP | 8-102079 | 4/1996 |
| JP | 10-222864 | 8/1998 |
| JP | 11-86328 | 3/1999 |
| JP | 2001-250257 | 9/2001 |
| JP | 2002-109771 | 4/2002 |
| JP | 2003-288733 | 10/2003 |

* cited by examiner

US 7,349,320 B2

APPARATUS FOR SWITCHING MODES BASED ON QUANTITY OF LIGHT RECEIVED IN FIRST SECTION OF A PHOTODETECTOR SECTION AND FIRST PLUS SECOND SECTION FOR CONTROLLING A LASER DIODE OUTPUT

BACKGROUND OF THE INVENTION

1. Field of the Invention

The present invention relates to an optical-disk drive device which applies light to an optical disk, and records or/and reproduces information.

2. Description of the Related Art

Conventionally, for example, as disclosed in Japanese Unexamined Patent Publication No. 10-222-864 specification, there is proposed an optical-disk drive device which can record and reproduce information at two numerical apertures (or NAs).

FIG. 15 shows a conventional optical-disk drive device, which is described in that specification. As shown in FIG. 15, the optical-disk drive device includes: several light receiving-and-emitting units 131, 132; a polarization beam splitter 135 which is a means for allowing optical paths to join together; a collimating lens 139; a half mirror 143 which is a means for allowing a luminous flux to branch off; a single photo-detector 144; and an objective lens 140. The light receiving-and-emitting unit 131 is provided with a light-emitting element 133 and a first light-receiving element 161. The light receiving-and-emitting unit 132 is provided with a light-emitting element 134 and a first light-receiving element 162. The photo-detector 144 is provided with a second light-receiving element 151. The light-emitting element 133 and the light-emitting element 134 are not simultaneously driven. Only either of them is driven to emit light.

The light-emitting element 133 is driven when an optical disk (i.e., a record medium) 141 is driven. At this time, a luminous flux 136 which has been emitted from the light-emitting element 133 passes through the polarization beam splitter 135. Then, it is transformed into a substantially parallel beam by the collimating lens 139. The luminous flux 136 which has been transformed into the substantially parallel beam is focussed on the optical disk 141 by the objective lens 140. The light which has been reflected by the optical disk 141 is traced back to the light receiving-and-emitting unit 131, through the optical path which it had passed along. Inside of the light receiving-and-emitting unit 131, the reflected light is led to the first light-receiving element 161 by a hologram element (not shown), and then, it is received.

The light-emitting element 134 is driven when an optical disk (i.e., a record medium) 142 is driven. At this time, a luminous flux 137 which has been emitted from the light-emitting element 134 is reflected and turned at a right angle by the polarization beam splitter 135. Then, it passes along the same optical path as that of the luminous flux 136. The reflected light 137 is transformed into a substantially parallel beam by the collimating lens 139 and is focussed on the optical disk 142 by the objective lens 140. The light which has been reflected by the optical disk 142 is traced back to the light receiving-and-emitting unit 132, through the optical path which it had passed along. Inside of the light receiving-and-emitting unit 132, the reflected light is led to the first light-receiving element 162 and is received.

The half mirror 143 reflects a part of the parallel beam from the collimating lens 139 and transmits the rest. The beams of light of the luminous flux 136 and the luminous flux 137 which have been reflected by the half mirror 143 are both received as the front light by the single second light-receiving element 151 inside of the photo-detector 144. A signal which is outputted from this photo-detector 144 is fed back to each drive circuit of the light-emitting elements. Thereby, the output of each of the light-emitting element 133 and the light-emitting element 134 can be kept constant.

As described above, a signal can be recorded on the optical disk 141 or the optical disk 142, or a signal which is recorded on the optical disk 141 or the optical disk 142 can be reproduced.

However, according to the above described conventional configuration, as shown in FIG. 16, only the middle part of each of the luminous flux 136 and the luminous flux 137 is detected by the second light-receiving element 151. If the light-emission pattern of each light-emitting element 133, 134 varies according to a change in the ambient temperature, a change in their light-emission power or the like, that can break off the proportional correlation between the light-emission quantity of each light-emitting element 133, 134 and the light-receiving quantity of the second light-receiving element 151. In such a case, a disadvantage may arise in that the quantity of light cannot be precisely controlled.

In addition, accurate light-quantity control may also be hindered in the case where a single optical-disk drive device makes a recording and a reproduction at several numerical apertures. Even if the total quantity of a luminous flux is designed to be detected at a specific numerical aperture by the second light-receiving element 151, then only a part of the luminous flux, or further, an unnecessary luminous flux, may be detected at another numerical aperture.

BRIEF SUMMARY OF INVENTION

In order to resolve the aforementioned conventional disadvantages, it is an object of the present invention to provide an optical-disk drive device which is capable of operating at a plurality of numerical apertures, controlling the quantity of light at each numerical aperture and keeping the light-emission quantity of a light-emitting element constant.

Aiming at attaining this object, an optical-disk drive device according to the present invention, which operates at a numerical aperture that corresponds to each of a plurality of optical disks, comprising: a light source; a branching element which allows a luminous flux that is emitted from the light source to branch off to a first luminous flux and a second luminous flux; a first detector which receives the first luminous flux that is obtained from the branching by the branching element; a controller which controls the quantity of light that is emitted by the light source, according to the quantity of light that is received by the first detector; and a second detector which receives the second luminous flux after the second luminous flux is reflected by an optical disk, wherein: the first detector includes a first detection area in which an inner luminous flux of the first luminous flux is received, and at least one second detection area in which an outer luminous flux of the first luminous flux is received; and the controller switches, from a first control state in which the quantity of light that is emitted by the light source is controlled based on the quantity of light that is received in the first detection area, to a second control state in which the quantity of light that is emitted by the light source is controlled based on the quantity of light that is received in the first detection area and the second detection area, and vice versa.

According to this configuration, when a small numerical aperture is set, the controller controls the quantity of light that is emitted by the light source, based on the quantity of light which is received in the first detection area in which only the inner luminous flux of the first luminous flux is received. On the other hand, when a large numerical aperture is set, the controller controls the quantity of light that is emitted by the light source, based on both the quantity of light which is received in the first detection area in which the inner luminous flux of the first luminous flux is received and the quantity of light which is received in the second detection area in which the outer luminous flux of the first luminous flux is received. In this way, the detection area is changed according to the numerical apertures, so that even at any numerical aperture, the total quantity of the first luminous flux can be detected according to the numerical aperture. Therefore, in the optical-disk drive device operating at several numerical apertures can be used, the quantity of light can be precisely controlled according to each numerical aperture.

The above described optical-disk drive device may also be configured so that between the branching element and the optical disk, an aperture restriction member is provided which the second luminous flux which is obtained from the branching by the branching element passes through; and the aperture restriction member switches, at least, from a first aperture state, to a second aperture state in which the diameter thereof is wider than that in the first aperture state so that the second luminous flux passes through, and vice versa.

According to this configuration, using the aperture restriction member, the numerical aperture of the second luminous flux which is incident on an optical disk can be set to several levels.

The above described optical-disk drive device may also be configured so that between the light source and the branching element, a collimating lens is provided which transforms, into a parallel luminous flux, a luminous flux that goes toward the branching element from the light source; the first detection area is circular whose diameter is substantially the same as that of the second luminous flux that passes through the aperture restriction member in the first aperture state; and the second detection area is located around the first detection area and has a ring shape whose external diameter is substantially the same as that of the second luminous flux that passes through the aperture restriction member in the second aperture state.

According to this configuration, the parallel luminous fluxes are incident on the branching element. Therefore, the first luminous flux and the second luminous flux at the time when they are emitted from the branching element each have the same diameter as that of the first luminous flux at the time when it is incident on the first detector. As a result, the aperture diameter of the aperture restriction member in the first aperture state may be set to be substantially the same as the external diameter of the first detection area. In the same way, the aperture diameter of the aperture restriction member in the second aperture state may be set to be substantially the same as the external diameter of the second detection area. This makes it possible to easily and certainly detect the total quantity of light according to each numerical aperture.

The above described optical-disk drive device may also be configured so that the aperture restriction member executes an aperture restriction operation for adjusting the luminous-flux diameter of the second luminous flux; and the controller switches from the first control state to the second control state, and vice versa, in connection with the aperture restriction operation of the aperture restriction member.

According to this configuration, the control state of the controller can certainly be adjusted according to each numerical aperture. This helps surely control the quantity of light which is emitted by the light source.

The above described optical-disk drive device may also be configured so that as the light source, a plurality of light sources are provided which emit light with a different wavelength from each other; between the branching element and the optical disk, an aperture restriction member is provided which the second luminous flux which is obtained from the branching by the branching element passes through; the aperture restriction member is formed by a filter which adjusts the luminous-flux diameter of the passing second luminous flux, based on the wavelength of the second luminous flux; and the controller switches the control state according to which of the light sources emits light.

According to this configuration, the aperture restriction member can be simply configured. At the same time, the quantity of light which is emitted by the light source can certainly be controlled.

The above described optical-disk drive device may also be configured so that as the light source, a plurality of light sources are provided which emit light with a different wavelength from each other; and the controller switches the control state according to which of the light sources emits light.

According to this configuration, a detection area is chosen according to the wavelength of a luminous flux which is received by the first detector. Therefore, in the case where a luminous flux is used whose wavelength is varied according to each numerical aperture, the quantity of light can be extremely precisely detected according to each numerical aperture.

The above described optical-disk drive device may also be configured so that as the light source, there are provided a first light source and a second light source which emits light with a shorter wavelength than that of the first light source; in the first detection area, the first luminous flux is received which is emitted from the first light source and is obtained from the branching by the branching element; and in the second detection area, the first luminous flux is received which is emitted from the second light source and is obtained from the branching by the branching element.

According to this configuration, the two light sources are used which are different in wavelength from each other. Hence, even if the luminous-flux diameter of a luminous flux with a short wavelength which is emitted from the second light source becomes wider, the total light quantity of the luminous flux can be detected by the first detector. This helps control the quantity of light extremely precisely, even though a plurality of numerical apertures are set.

The above described optical-disk drive device may also be configured so that the numerical apertures are set at any two of approximately 0.45, approximately 0.6 and approximately 0.85.

According to this configuration, as the single optical-disk drive device, any two are combined of a system with a numerical aperture of 0.45 which is typical of a CD (or compact disk), a system with a numerical aperture of 0.6 which is typical of a DVD (or digital versatile disk) and a system with a numerical aperture of 0.85 which is typical of a BD (or Blu-ray disk). In this case, a signal can be obtained for controlling the quantity of light according to each numerical aperture.

The above described optical-disk drive device may also be configured so that as the light source, there are provided a first light source, a second light source which emits light with a shorter wavelength than that of the first light source, and a third light source which emits light with a shorter wavelength than that of the second light source; the first detector includes a first detection area in which an inner luminous flux of the first luminous flux is received, a second detection area in which an outer luminous flux of the first luminous flux is received, and a third detection area in which an outermost luminous flux of the first luminous flux is received; and the controller switches among a first control state in which the quantity of light that is emitted by the first light source is controlled based on the quantity of light that is received in the first detection area, a second control state in which the quantity of light that is emitted by the second light source is controlled based on the quantity of light that is received in the first detection area and the second detection area, and a third control state in which the quantity of light that is emitted by the third light source is controlled based on the total quantity of light that is received in the first detection area, the second detection area and the third detection area.

According to this configuration, the three light sources are used which are different in wavelength from each other. Hence, even if the wavelength of a luminous flux which is emitted from the light source shortens and the luminous-flux diameter is widened according to it, the total light quantity of the luminous flux can be detected by the first detector. This helps control the quantity of light extremely precisely, even though a plurality of numerical apertures are set.

The above described optical-disk drive device may also be configured so that the numerical apertures are set at approximately 0.45, approximately 0.6 and approximately 0.85.

According to this configuration, the single optical-disk drive device is formed by a system with a numerical aperture of 0.45, a system with a numerical aperture of 0.6 and a system with a numerical aperture of 0.85. In this case, a signal can be obtained for controlling the quantity of light according to each numerical aperture.

The above described optical-disk drive device may also be configured so that the plurality of light sources are each disposed in a separate package. In this case, general-purpose light sources can be used as the light sources.

The above described optical-disk drive device may also be configured so that the first detection area and the second detection area are concentric with each other.

According to this configuration, all you have to do is to form the pattern of a detection area in the first detector, according to the diameter of the inner luminous flux and the diameter of the outer luminous flux of the first luminous flux. By doing so, a signal can be obtained for controlling the quantity of light according to numerical apertures. This makes the configuration of such an apparatus more simple.

The above described optical-disk drive device may also be configured so that a diffractive element is provided between the branching element and the first detector; and the diffractive element includes a first diffraction portion which diffracts the inner luminous flux toward the first detection area, and a second diffraction portion which diffracts the outer luminous flux toward the second detection area.

According to this configuration, the inner luminous flux and the outer luminous flux of the first luminous flux which is obtained from the branching by the branching element are separately diffracted, and then, both luminous fluxes are split. This raises the degree of freedom of the detection-area pattern of the first detector. It also makes it easy to adjust the position of the first detector.

The above described optical-disk drive device may also be configured so that a light-converging element is provided between the diffractive element and the first detector.

According to this configuration, the luminous flux which has been split by the diffractive element according to numerical apertures can be converged on the first detector by the light-converging element. Thereby, a signal can be obtained for controlling the quantity of light.

The above described optical-disk drive device may also be configured so that between the branching element and the first detector, an aperture restriction member is provided which the first luminous flux which is obtained from the branching by the branching element passes through; and the aperture restriction member switches, at least, from a first aperture state, to a second aperture state in which a luminous flux passes through whose diameter is substantially the same as that of the second luminous flux whose diameter is wider than that of the first aperture state, and vice versa.

According to this configuration, the luminous-flux diameter of the first luminous flux which is obtained from the branching by the branching element is adjusted by the aperture restriction member. Therefore, an adjustment can be made so that the total light quantity of the first luminous flux can be received in each detection area.

The above described optical-disk drive device may also be configured so that the branching element is formed by a hologram element. According to this configuration, component parts can be integrated.

In the optical-disk drive device according to the present invention, a plurality of numerical apertures can be used, as well as the light-emission quantity of a light-emitting element can be kept constant according to each numerical aperture.

These and other objects, features and advantages of the present invention will become more apparent upon reading of the following detailed description along with the accompanied drawings.

DETAILED DESCRIPTION OF THE INVENTION

Hereinafter, an optical-disk drive device according to embodiments of the present invention will be described in detail with reference to the accompanied drawings.

FIRST EMBODIMENT

Figure 1:
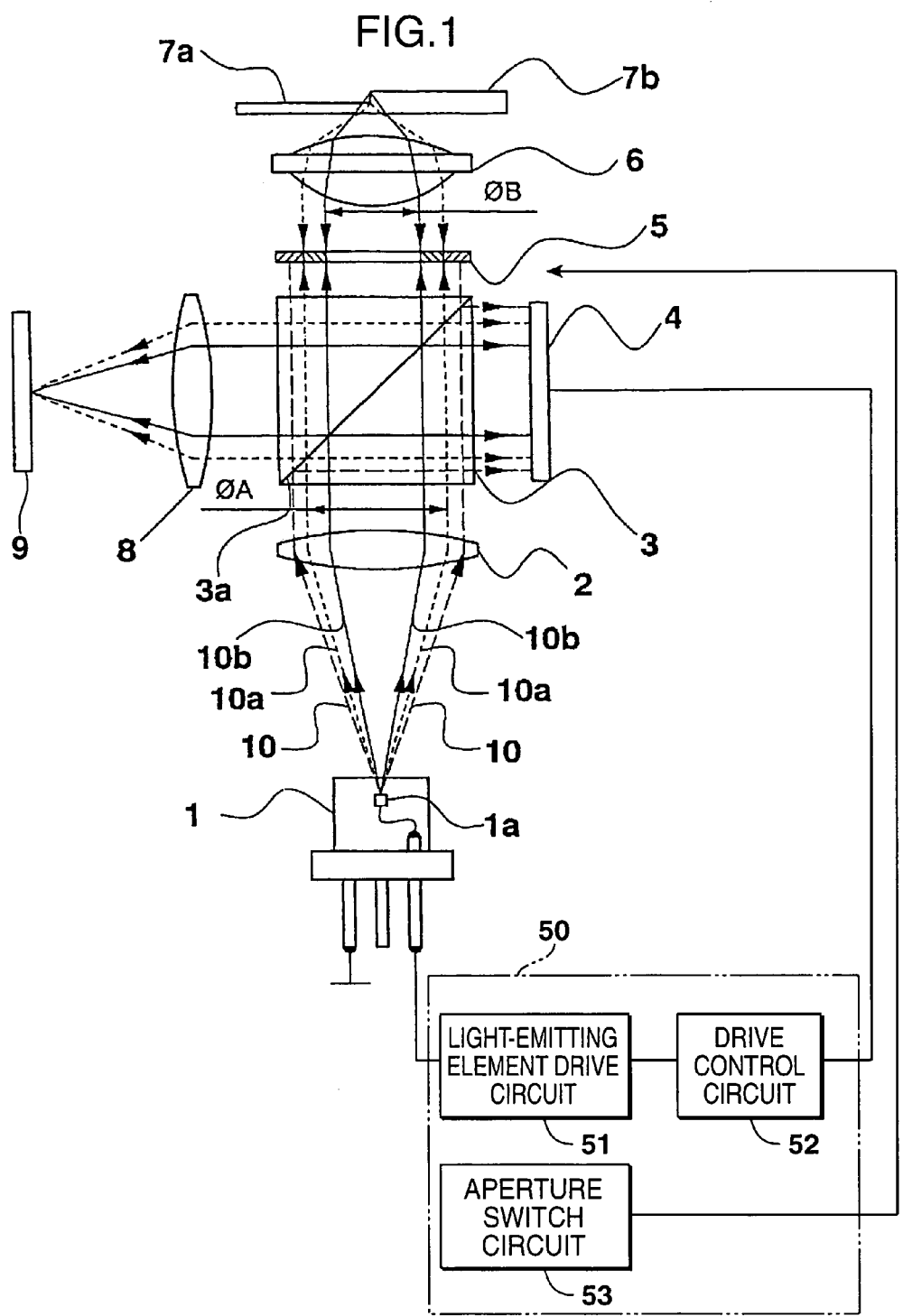
FIG. 1 is a schematic view of an optical-disk drive device according to a first embodiment of the present invention, showing its configuration.
Figure 2:
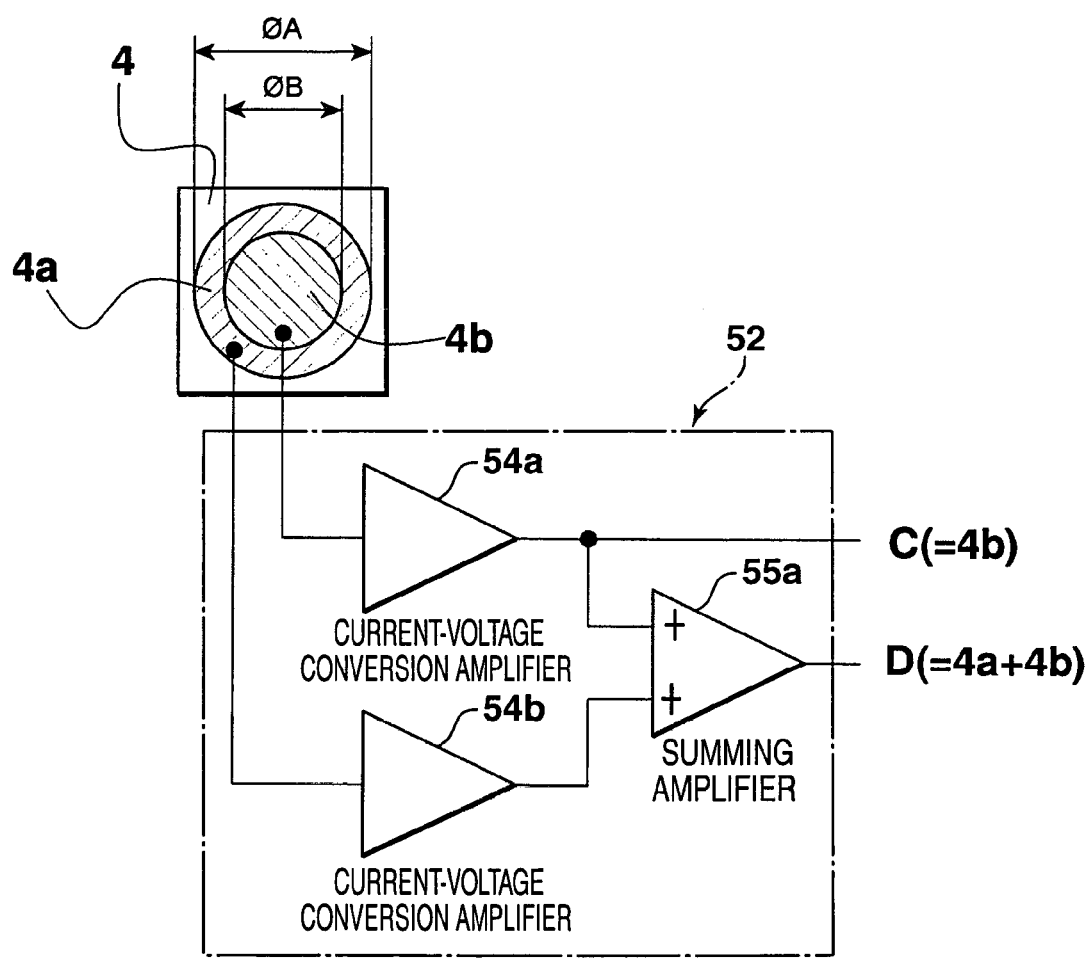
FIG. 2 is a circuit diagram of a photo-detector and a drive control circuit which are provided in the optical-disk drive device.

FIG. 1 shows an optical-disk drive device according to a first embodiment of the present invention. FIG. 2 shows the shape and arithmetic circuit of a photo-detector. As shown in FIG. 1, this optical-disk drive device can set two numerical apertures (i.e., a large numerical aperture and a small numerical aperture). It includes as its main elements: a light-emitting element 1a which is the light source; a collimating lens 2; a beam splitter 3 which is the branching element; a photo-detector 4 which is the first detector; an aperture restriction member 5; an objective lens 6; a photo-detector 9 which is the second detector; and a controller 50. In this optical-disk drive device, the large numerical aperture is set when an optical disk 7a which is the record medium is mounted. On the other hand, the small numerical aperture is set when an optical disk 7b is mounted.

The light-emitting element 1a is mounted in a package 1 and forms a light-emission portion which emits light. The collimating lens 2 is displaced between the light-emitting element 1a and the beam splitter 3. It transforms, into a substantially parallel beam, a luminous flux 10 which has been emitted from the light-emitting element 1a and has gone toward the beam splitter 3. The beam splitter 3 allows the luminous flux 10 which has been transformed into the substantially parallel beam to branch off. It has a reflection surface 3a. At the reflection surface 3a of the beam splitter 3, the luminous flux 10 branches to a first luminous flux which is led to the photo-detector 4 and a second luminous flux which is led to the objective lens 6 (i.e., the optical disks 7a, 7b which are the record medium).

The photo-detector 4 detects a part of the parallel luminous flux 10, or the first luminous flux which has been reflected by the reflection surface 3a of the beam splitter 3.

The aperture restriction member 5 is displaced between the beam splitter 3 and the objective lens 6. The aperture restriction member 5 makes an adjustment so as to restrict the luminous-flux diameter of the second luminous flux of the parallel luminous flux 10 which has passed through the reflection surface 3a of the beam splitter 3 and is incident on the objective lens 6. It can switch from a first aperture state to a second aperture state, and vice versa. The first aperture state is an aperture state which corresponds to the small numerical aperture. It screens out the peripheral luminous flux of the second luminous flux, so that a second luminous flux 10b has a luminous-flux diameter of φB. Then, it passes through. In FIG. 1, this second luminous flux 10b is shown by solid lines. On the other hand, the second aperture state is an aperture state which corresponds to the large numerical aperture. It screens out the peripheral luminous flux of the second luminous flux, so that a second luminous flux 10a has a luminous-flux diameter of φA. Then, it passes through. In FIG. 1, this second luminous flux 10a is shown by broken lines.

The aperture restriction member 5 is configured so that the above-described aperture state of the aperture restriction member 5 can be switched by controlling the voltage which is applied to a liquid-crystal element. This aperture restriction member 5's aperture-state switching is executed, as described later, by the above described controller 50. Herein, the aperture restriction member 5 may also be configured so that a light-shielding member with aperture parts whose internal diameters are φA and φB is brought in and taken out of the optical path of the second luminous flux. Or, it may also be configured so that a light-shielding member which has a variable aperture part between the internal diameters φA and φB switches an aperture restriction. In this case, the controller 50 controls the drive of the aperture restriction member 5.

The objective lens 6 focuses a luminous flux on the optical disks 7a, 7b. Each optical disk 7a, 7b is a record medium which makes a recording and a reproduction. When the aperture restriction member 5 is in the second aperture state (i.e., at the large numerical aperture), the second luminous flux 10a with the diameter φA is focused on the optical disk 7a. On the other hand, on the optical disk 7b, the second luminous flux 10b with the diameter φB is converged when the aperture restriction member 5 is in the first aperture state (i.e., at the small numerical aperture).

A detection lens 8 is disposed between the beam splitter 3 and the photo-detector 9. This detection lens 8 converges, on the photo-detector 9, the luminous flux which has been reflected by each optical disk 7a, 7b. The photo-detector 9 is used to detect a servo signal and an RF signal.

As shown in FIG. 2, the photo-detector 4 includes a first detection area 4b and a second detection area 4a. Both detection areas 4a, 4b form a light-detection portion which has a substantially concentric circle in the photo-detector 4. The first detection area 4b is a circular area whose external diameter is substantially the same as the diameter φB of the second luminous flux at the time of the small numerical aperture. Thereby, the first luminous flux at the time of the small numerical aperture, or an inner luminous flux of the first luminous flux at the time of the large numerical aperture, is incident on the first detection area 4b. On the other hand, the second detection area 4a is formed on the peripheral side of the first detection area 4b, so that it surrounds the first detection area 4b. It is a ring-shaped area whose internal diameter is substantially the same as the diameter φB of the second luminous flux at the time of the small numerical aperture, and whose external diameter is substantially the same as the diameter φA of the second luminous flux at the time of the large numerical aperture. Thereby, an outer luminous flux of the first luminous flux is incident on the second detection area 4a.

The controller 50 includes a light-emitting element drive circuit 51, a drive control circuit 52, and an aperture switch circuit 53.

A detection signal from the photo-detector 4 is inputted in the drive control circuit 52, and the drive control circuit 52 outputs a control signal to the light-emitting element drive circuit 51. This drive control circuit 52 includes two current-voltage conversion amplifiers 54a, 54b, and a summing amplifier 55a. It can switch from a first control state to a second control state, vice versa. In the first control state, it outputs a control signal according to the received light quantity of the first luminous flux which is received in the first detection area 4b. On the other hand, in the second control state, it outputs a control signal according to the received light quantity of the first luminous flux which is received in both detection areas 4b, 4a.

The light-emitting element drive circuit 51 outputs a feedback signal to the light-emitting element 1a, according to an output voltage from the drive control circuit 52. Thereby, control is executed of the quantity of light which is emitted from the light-emitting element 1a.

The aperture switch circuit 53 controls the switching of an aperture restriction by the aperture restriction member 5, according to the base-material thickness (i.e., the distance from the surface of an optical disk on the side of the objective lens 6 to its record layer) of the mounted optical disks 7a, 7b. This switching control is executed, for example, by controlling the voltage which is applied to a liquid-crystal element.

In the optical-disk drive device which is configured as described above, its operation will be described below. If the optical disk 7a is mounted in the optical-disk drive device, the controller 50 switches the aperture restriction member 5 to the second aperture state of the large numerical aperture. It also switches the drive control circuit 52 to the second control state.

The luminous flux 10 which has been emitted from the light-emitting element 1a is transformed into a substantially parallel beam by the collimating lens 2. Then, it is incident on the beam splitter 3. A part of this luminous flux 10 which has been incident on the beam splitter 3, or the second luminous flux, passes through the reflection surface 3a of the beam splitter 3. On the other hand, its remaining part, or the first luminous flux, is reflected by the reflection surface 3a of the beam splitter 3.

The second luminous flux which has passed through the reflection surface 3a passes through the aperture restriction member 5. At this time, its aperture is restricted, and thereby, it turns into the luminous flux 10a with the luminous-flux diameter φA. This luminous flux 10a passes through the objective lens 6 and foceses on the optical disk 7a. The luminous flux 10a which has been reflected by the optical disk 7a passes through the objective lens 6 and the aperture restriction member 5. Then, it is incident on the beam splitter 3. This luminous flux 10a is reflected by the reflection surface 3a and is converged on the photo-detector 9 by the detection lens 8 to form a spot. Thereby, a servo signal and an RF signal are detected.

On the other hand, the first luminous flux which has been reflected by the reflection surface 3a of the beam splitter 3 is incident on the photo-detector 4. This first luminous flux is produced after the luminous flux 10 at the time of the large numerical aperture has branched off. Then, it is incident on the whole surface of the first detection area 4b and the second detection area 4a. Therefore, the photo-detector 4 detects the light quantity of the first luminous flux which corresponds to the second luminous flux 10a with the diameter φA. Then, the electric currents which have been obtained in both detection areas 4b, 4a are each converted into a voltage by the current-voltage conversion amplifiers 54a, 54b. Then, the controller 50 obtains a single signal C from the current-voltage conversion amplifier 54a which is connected to the first detection area 4b, and an addition signal D which is obtained by adding signals from the current-voltage conversion amplifiers 54a, 54b by the summing amplifier 55a. Then, at the time of the large numerical aperture, the addition signal D is outputted to the light-emitting element drive circuit 51. This light-emitting element drive circuit 51 issues a feedback signal, so that control is executed for keeping constant the power of the light-emitting element 1a. In other words, at the time of the large numerical aperture, the light quantity of the luminous flux with the luminous-flux diameter φA is received, and then, control is executed according to that.

In contrast, if the optical disk 7b is mounted in the optical-disk drive device, the aperture restriction member 5 is switched to the first aperture state of the small numerical aperture. In addition, the drive control circuit 52 is switched to the first control state.

The second luminous flux which has passed through the reflection surface 3a of the beam splitter 3 and the aperture restriction member 5 turns into the luminous flux 10b whose aperture is restricted to the luminous-flux diameter φB. In the same way as described above, it passes through the objective lens 6 and focuses on the optical disk 7b. Then, this luminous flux 10b is incident on the objective lens 6, the aperture restriction member 5 and the beam splitter 3. Next, it is reflected by the reflection surface 3a and is converged on the photo-detector 9 to form a spot.

On the other hand, the first luminous flux which has been reflected by the reflection surface 3a of the beam splitter 3 is incident on the first detection area 4b and the second detection area 4a of the photo-detector 4. Then, the controller 50 outputs a single signal C from the current-voltage conversion amplifier 54a which is connected to the first detection area 4b to the light-emitting element drive circuit 51. In other words, at the time of the small numerical aperture, the light quantity of the first luminous flux 10b is detected which corresponds to the second luminous flux 10b with the luminous-flux diameter φB. Thereby, control is executed for keeping constant the power of the light-emitting element 1a.

According to this configuration, a signal for detecting the front light can be obtained which is most suitable for each numerical aperture (or optical disk for recording and reproduction). Hence, the light-emitting element 1a can be accurately driven according to a numerical aperture (or an optical disk for recording and reproduction).

Furthermore, in this first embodiment, the first luminous flux and the second luminous flux at the time of the branching by the beam splitter 3 have the same diameter as that of the first luminous flux at the time when it is incident on the photo-detector 4. In addition, the aperture diameter of the aperture restriction member 5 in the first aperture state is substantially the same as that of the first detection area 4b. Besides, the aperture diameter of the aperture restriction member 5 in the second aperture state is substantially the same as the external diameter of the second detection area 4a. This makes it possible to easily and certainly detect the total quantity of light according to each numerical aperture.

Moreover, in this first embodiment, switching is executed from the first control state to the second control state, and vice versa, in connection with an aperture restriction operation of the aperture restriction member 5. Therefore, the control state of the controller 50 can certainly be adjusted according to each numerical aperture. This helps certainly control the quantity of light which is emitted by the light-emitting element.

In addition, in this first embodiment, the first detection area 4b and the second detection area 4a are formed concentrically. Therefore, all you have to do is to form the pattern of a detection area in the photo-detector 4, according to the inner luminous flux and the outer luminous flux of the first luminous flux. By doing so, a signal can be obtained for controlling the quantity of light according to numerical apertures. This makes the configuration of such an apparatus more simple.

SECOND EMBODIMENT

Figure 3:
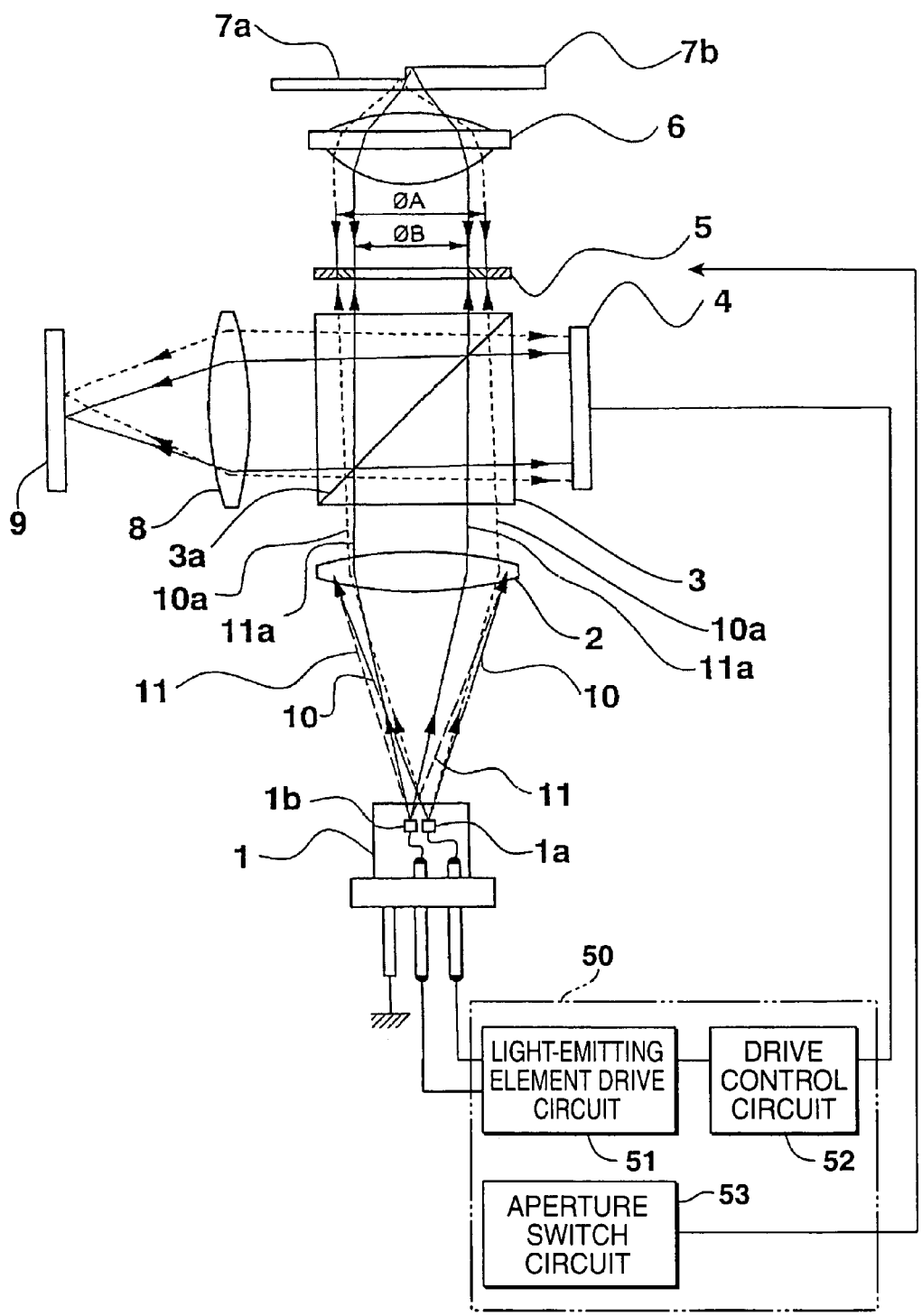
FIG. 3 is a schematic view of an optical-disk drive device according to a second embodiment of the present invention, showing its configuration.

FIG. 3 shows an optical-disk drive device according to a second embodiment of the present invention. As shown in FIG. 3, in this second embodiment, there are provided a light-emitting element 1a which is used at the time of the large numerical aperture, and a light-emitting element 1b which is used at the time of the small numerical aperture. In FIG. 3, a luminous flux 10 which is emitted from the light-emitting element 1a is shown by broken lines. On the other hand, a luminous flux 11 which is emitted from the light-emitting element 1b is shown by solid lines.

The light-emitting element 1a and the light-emitting element 1b emit light which has a different wavelength from each other. For example, the light-emitting element 1a emits light whose wavelength is 405 nm, while the light-emitting element 1b emits light whose wavelength is 650 nm. In this second embodiment, both light-emitting elements 1a, 1b are disposed in the package 1. Herein, the light-emitting element 1a and the light-emitting element 1b are not limited to this. Among a wavelength of 405 nm, 650 nm and 790 nm, any combinations can be used, as long as the wavelength of light which is emitted from the light-emitting element 1a is shorter than the wavelength of light which is emitted from the light-emitting element 1b.

The aperture restriction member 5 screens out the peripheral part of the second luminous flux 10 which has been emitted from the light-emitting element 1a. Then, the luminous flux 10a whose diameter has been turned into φA passes through, and then, it is led to the objective lens 6. On the other hand, it screens out the peripheral part of the second luminous flux 11 which has been emitted from the light-emitting element 1b. Then, the luminous flux 11a whose diameter has been turned into φB passes through, and then, it is led to the objective lens 6.

The controller 50 allows the light-emitting element 1a to emit light when recording or reproduction is executed at a high density in the optical disk 7a. It also allows the aperture restriction member 5 to place an aperture restriction on the luminous flux 10 which has been emitted from the light-emitting element 1a, so that its luminous-flux diameter becomes φA. On the other hand, the controller 50 allows the light-emitting element 1b to emit light when recording or reproduction is executed at a low density in the optical disk 7b. It also allows the aperture restriction member 5 to impose an aperture restriction on the luminous flux 11 which has been emitted from the light-emitting element 1b, so that its luminous-flux diameter becomes φB. The light-emitting element 1a and the light-emitting element 1b are not driven at the same time. Only either of them is driven to emit light, according to each optical disk 7a, 7b in which recording or reproduction is executed. The other operations are the same as those of the first embodiment, and thus, their detailed description is omitted here.

According to this configuration, each detection area 4a, 4b is chosen according to the wavelength of the first luminous flux which is received by the photo-detector 4. Therefore, in the case where a luminous flux is used whose wavelength is varied according to each numerical aperture, the quantity of light can be extremely precisely detected according to each numerical aperture.

Herein, the aperture restriction member 5 may also be formed by a wavelength selection-type filter which can adjust a luminous-flux diameter based on the wavelength of a passing luminous flux. In that case, the aperture switch circuit 53 can be omitted.

The other configurations and the like are the same as those of the first embodiment.

THIRD EMBODIMENT

Figure 4:
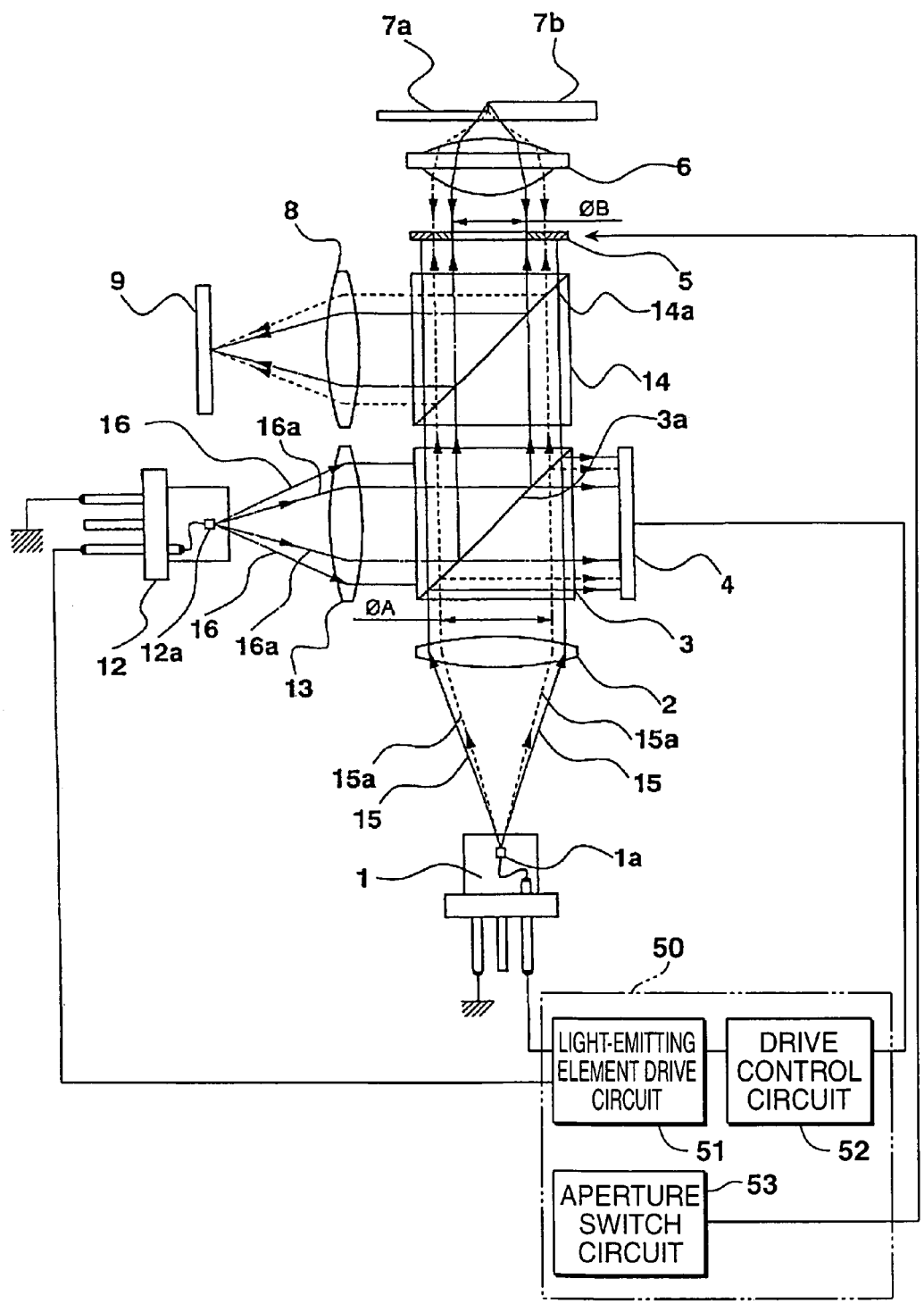
FIG. 4 is a schematic view of an optical-disk drive device according to a third embodiment of the present invention, showing its configuration.

FIG. 4 shows an optical-disk drive device according to a third embodiment of the present invention. As shown in FIG. 4, in this third embodiment, different from the second embodiment, a plurality of light-emitting elements are each disposed in a separate package.

Figure 14:
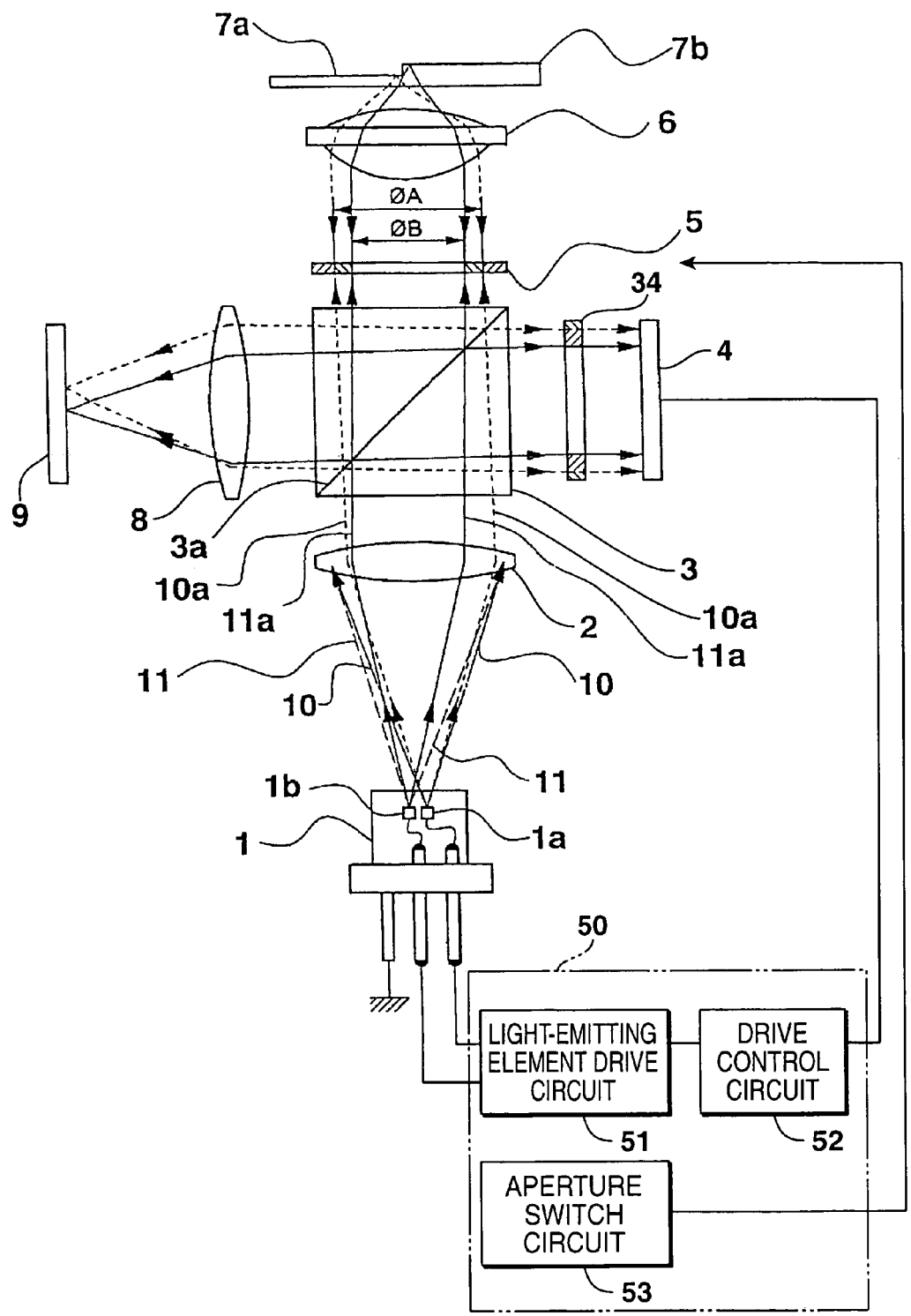
FIG. 14 is a schematic view of an optical-disk drive device according to a ninth embodiment of the present invention, showing its configuration.
Figure 15:
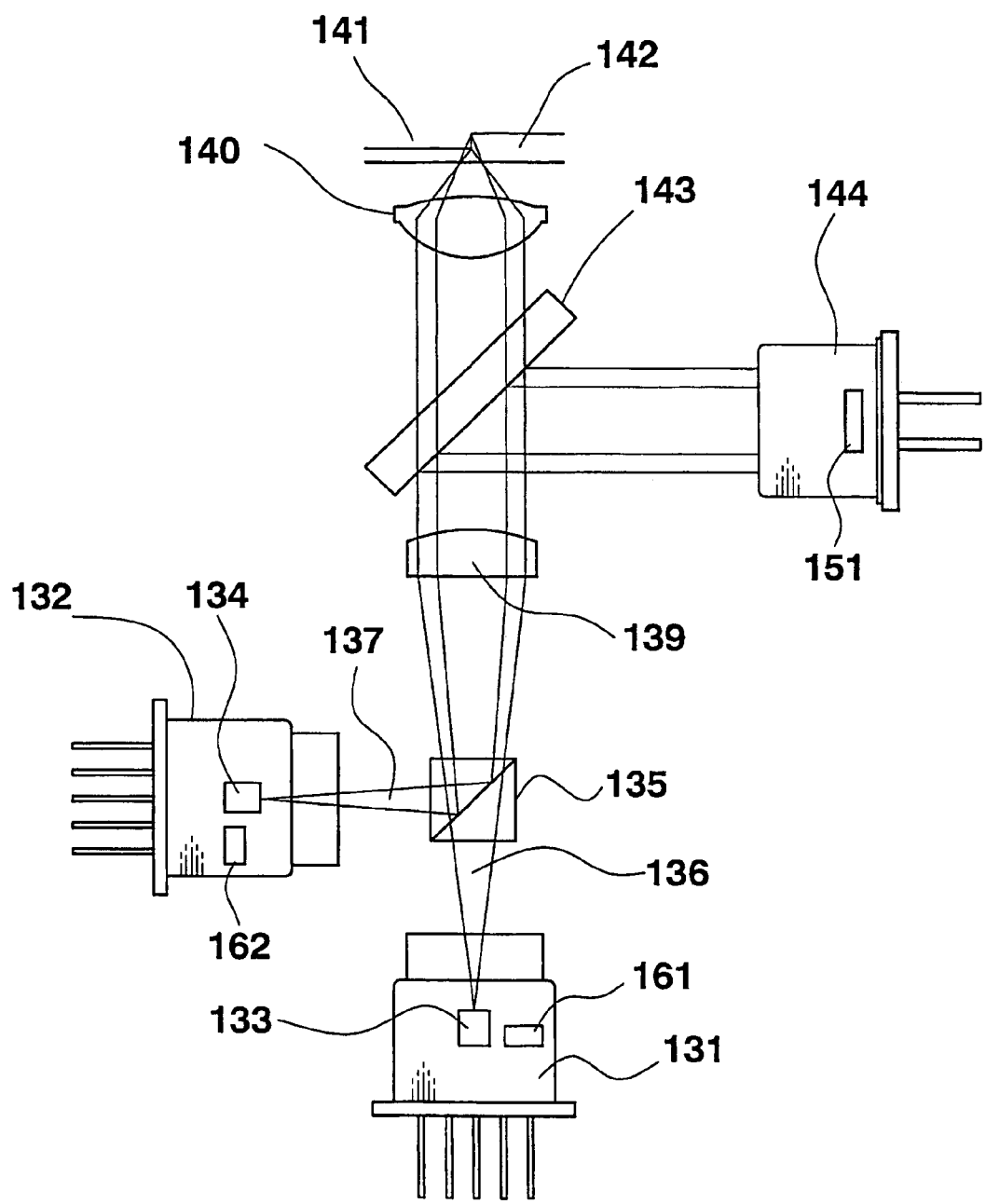
FIG. 15 is a schematic view of a conventional optical-disk drive device, showing its configuration.
Figure 16:
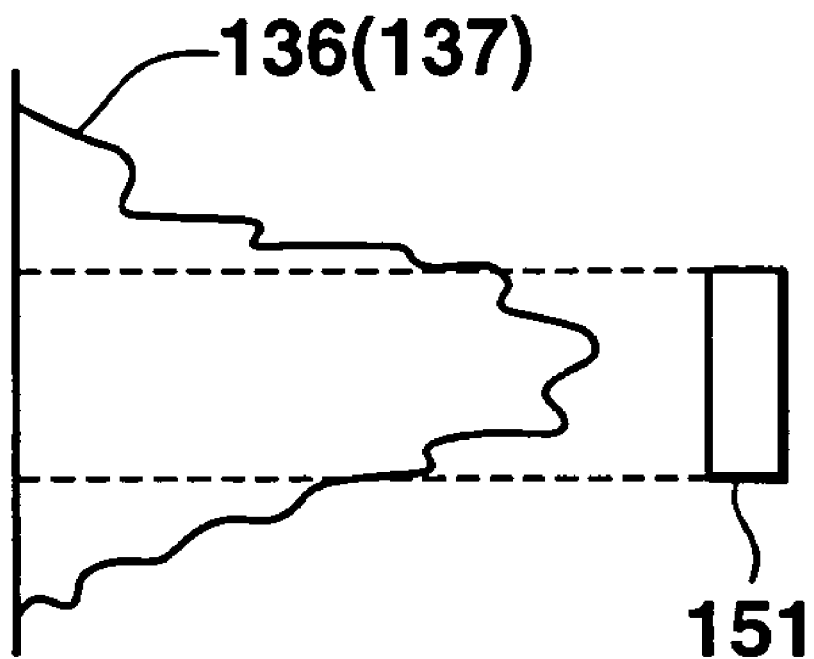
FIG. 16 is a schematic view of a detector and the intensity distribution of a luminous flux which is incident on it.

In this third embodiment, the light-emitting element 1a is mounted in the package 1, and a light-emitting element 12a is mounted in a package 12. In FIG. 14, a luminous flux 15 is emitted from the light-emitting element 1a. Then, the peripheral part of the luminous flux 15 is screened out by the aperture restriction member 5. As a result, a luminous flux 15a which has a diameter of φA is formed, which is shown by broken lines. In the same figure, a luminous flux 16 is emitted from the light-emitting element 12a. Then, the peripheral part of the luminous flux 16 is screened out by the aperture restriction member 5. As a result, a luminous flux 16a which has a diameter of φB is formed, which is shown by solid lines.

The light-emitting element 1a and the light-emitting element 12a emit light which has a different wavelength from each other. For example, the light-emitting element 1a emits light whose wavelength is 405 nm, while the light-emitting element 12a emits light whose wavelength is 650 nm. The light-emitting element 1a is driven at the time of the large numerical aperture, while the light-emitting element 12a is driven at the time of the small numerical aperture. The light-emitting element 1a and the light-emitting element 12a are not simultaneously driven. Only either of them is driven according to an optical disk for recording or reproduction. Herein, the light-emitting element 1a and the light-emitting element 12a are not limited to this. Among a wavelength of 405 nm, 650 nm and 790 nm, any combinations can be used, as long as the wavelength of light which is emitted from the light-emitting element 1a is shorter than the wavelength of light which is emitted from the light-emitting element 12a.

A collimating lens 13 is also disposed between the light-emitting element 12a and the beam splitter 3. The collimating lens 2 transforms, into a parallel luminous flux, the luminous flux 15 which is emitted from the light-emitting element 1a and goes toward the beam splitter 3. On the other hand, the collimating lens 13 transforms, into a parallel luminous flux, the luminous flux 16 which is emitted from the light-emitting element 12a and goes toward the beam splitter 3.

Upon the beam splitter 3, the luminous flux 15 from the light-emitting element 1a and the luminous flux 16 from the light-emitting element 12a are each incident from the perpendicular direction to each other. Then, the reflection surface 3a of the beam splitter 3 allows the luminous flux which has been emitted from the light-emitting element 1a to branch off to a first luminous flux and a second luminous flux. The first luminous flux is reflected by the reflection surface 3a and is turned at a right angle, and then, it is led to the photo-detector 4. The second luminous flux passes through the reflection surface 3a and reaches the objective lens 6. On the other hand, the reflection surface 3a of the beam splitter 3 allows the luminous flux which has been emitted from the light-emitting element 12a to branch off to a first luminous flux and a second luminous flux. The first luminous flux passes through the reflection surface 3a and reaches the photo-detector 4. The second luminous flux is reflected by the reflection surface 3a and is turned at a right angle, and then, it is led to the objective lens 6.

Between the beam splitter 3 and the aperture restriction member 5, there is disposed a beam splitter 14. The beam splitter 14 allows a luminous flux to branch off, and it has a reflection surface 14a. This reflection surface 14a transmits a luminous flux from the beam splitter 3 and guides it to the objective lens 6. In addition, it reflects a luminous flux which passes through the objective lens 6 and guides it to the photo-detector 9.

The aperture restriction member 5 is disposed between the beam splitter 14 and the objective lens 6.

At the time of the large numerical aperture when recording or reproduction is executed at a high density in the optical disk 7a, the light-emitting element 1a emits light. Then, the aperture restriction member 5 puts an aperture restriction on the luminous flux 15 which has been emitted from the light-emitting element 1a, so that its luminous-flux diameter becomes φA. On the other hand, at the time of the small numerical aperture when recording or reproduction is executed at a low density in the optical disk 7b, the light-emitting element 12a emits light. Then, it puts an aperture restriction on the luminous flux 16 which has been emitted from the light-emitting element 12a, so that its luminous-flux diameter becomes φB.

The luminous flux 15 which has been emitted from the light-emitting element 1a at the time of the large numerical aperture, is transformed into a substantially parallel beam by the collimating lens 2. Then, it is incident on the beam splitter 3 and branches off to the first luminous flux and the second luminous flux. The second luminous flux passes through the reflection surface 3a and is incident on the beam splitter 14. Then, it passes through its reflection surface 14a and undergoes an aperture restriction by the aperture restriction member 5, so that its diameter turns into φA. This luminous flux 15a is incident on the objective lens 6 to form a focal point on the optical disk 7a. Then, the luminous flux 15a which has been reflected by the optical disk 7a passes through the objective lens 6 and the aperture restriction member 5 and is incident on the beam splitter 14. Then, it is reflected by its reflection surface 14a, and through the detection lens 8, it converges on the photo-detector 9. Thereby, a servo signal and an RF signal are detected.

In contrast, the luminous flux 16 which has been emitted from the light-emitting element 12a at the time of the small numerical aperture, is transformed into a substantially parallel beam by the collimating lens 13. Then, it is incident on the beam splitter 3 and branches off to the first luminous flux and the second luminous flux. The second luminous flux is reflected by the reflection surface 3a and is incident on the beam splitter 14. Then, it passes through its reflection surface 14a and undergoes an aperture restriction by the aperture restriction member 5, so that its diameter turns into φB. This luminous flux 16a is incident on the objective lens 6 to form a focal point on the optical disk 7b. Then, the luminous flux 16a which has been reflected by the optical disk 7b passes again through the objective lens 6 and the aperture restriction member 5 and is incident on the beam splitter 14. Then, it is reflected by its reflection surface 14a, and through the detection lens 8, it converges on the photo-detector 9. Thereby, a servo signal and an RF signal are detected.

At both times of the large numerical aperture and the small numerical aperture, the first luminous flux which has been obtained from the branching by the reflection surface 3a of the beam splitter 3 is incident on the photo-detector 4. At this time, the luminous flux which has been emitted from the light-emitting element 1a is detected in the first detection area 4b and the second detection area 4a. Then, a detection signal from each of the first detection area 4b and the second detection area 4a is converted into a voltage by the current-voltage conversion amplifiers 54a, 54b, respectively. Then, the single signal C, and the addition signal D by the summing amplifier 55a, are obtained.

At the time of the large numerical aperture, the addition signal D is used as a feedback signal from the controller 50, and then, control is executed for keeping constant the power of the light-emitting element 1a. In other words, at the time of the large numerical aperture, the quantity of light is controlled based on the total received-light quantity of the received-light quantity of the outer luminous flux and the received-light quantity of the inner luminous flux. On the other hand, at the time of the small numerical aperture, the single signal C is used as a feedback signal from the controller 50, and then, control is executed for keeping constant the power of the light-emitting element 12a. In other words, at the time of the small numerical aperture, the quantity of light is controlled based on the received-light quantity of the inner luminous flux.

According to this configuration, even if the luminous-flux diameter of a luminous flux with a short wavelength which is emitted from the light-emitting element 1a becomes wider, the total light quantity of the luminous flux can be detected by the photo-detector 4. This helps control the quantity of light extremely precisely, even though a plurality of numerical apertures are set.

Herein, the aperture restriction member 5 may also be formed by a wavelength selection-type filter which can adjust a luminous-flux diameter based on the wavelength of a passing luminous flux. Thereby, the configuration of the aperture restriction member 5 becomes simpler. In that case, the aperture switch circuit 53 can be omitted.

The other configurations and the like are the same as those of the second embodiment.

FOURTH EMBODIMENT

Figure 5:
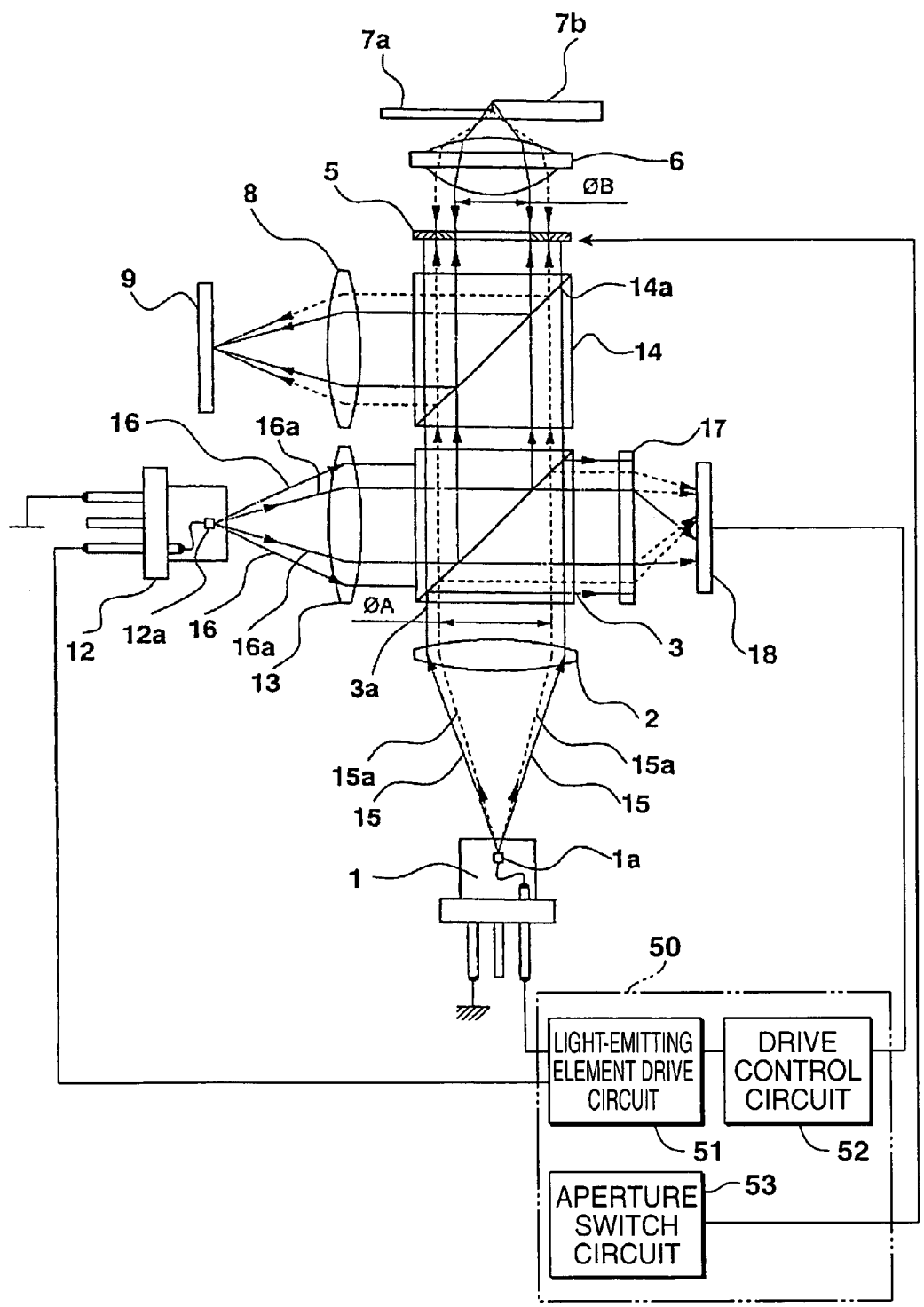
FIG. 5 is a schematic view of an optical-disk drive device according to a fourth embodiment of the present invention, showing its configuration.
Figure 6:
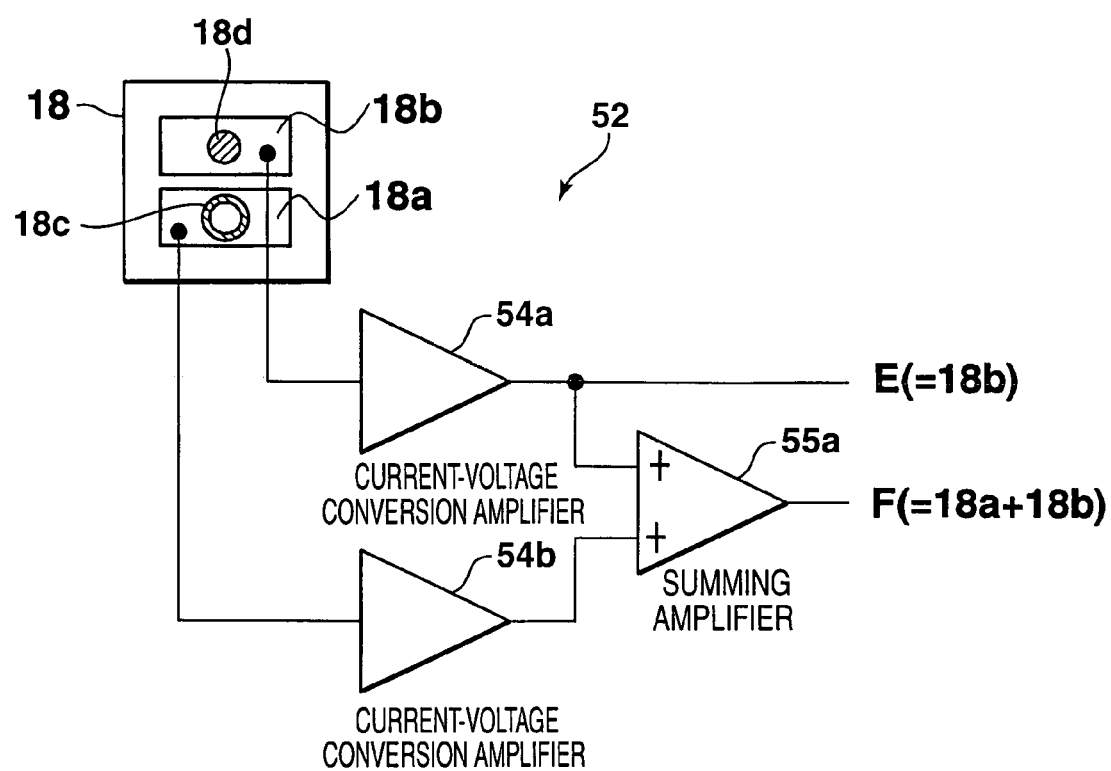
FIG. 6 is a circuit diagram of the photo-detector and the drive control circuit which are provided in the optical-disk drive device.

FIG. 5 shows an optical-disk drive device according to a fourth embodiment of the present invention. FIG. 6 shows the photo-detector and the drive control circuit 52 which are provided in this optical-disk drive device.

As shown in FIG. 5, a hologram element 17 is disposed between the beam splitter 3 and a photo-detector (i.e., the first detector) 18. This hologram element 17 splits the front light according to numerical apertures. The photo-detector 18 detects the front light which has been split by the hologram element 17.

Figure 7:
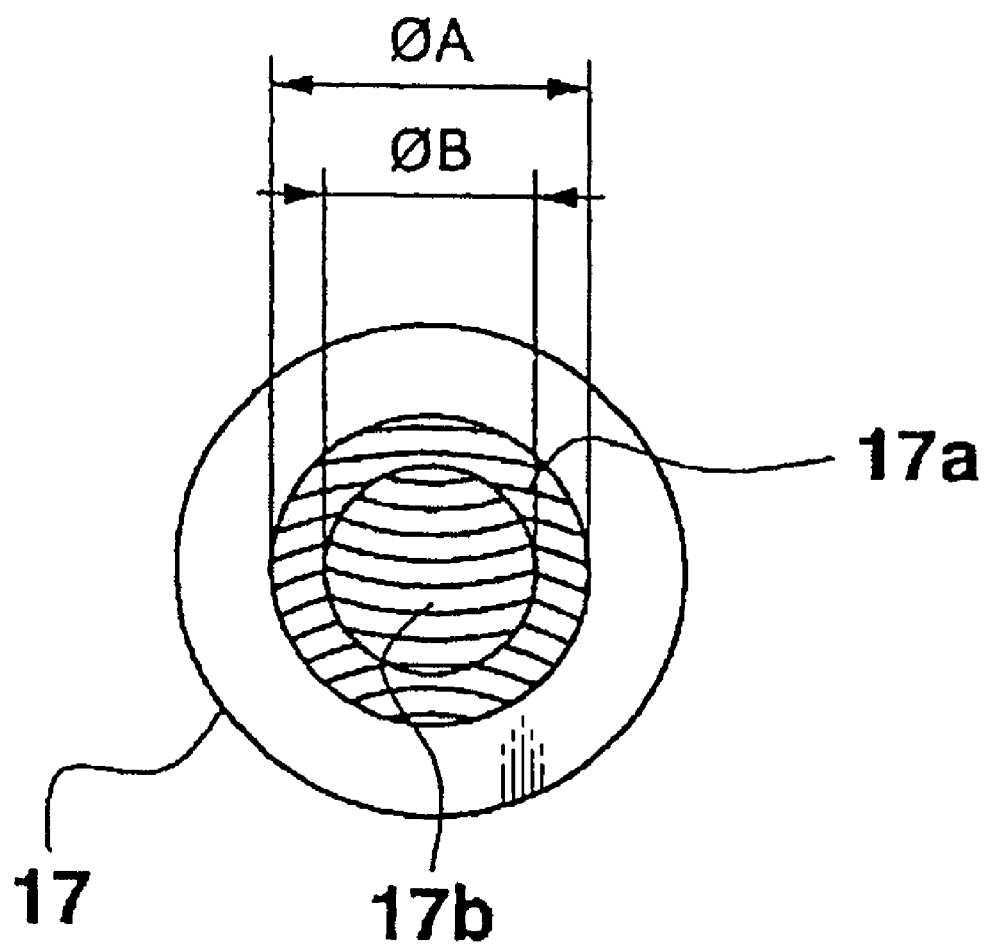
FIG. 7 is a schematic view of a hologram element which is provided in the optical-disk drive device, showing its configuration.

As shown in FIG. 7, the hologram element 17 includes a first diffraction portion 17b and a second diffraction portion 17a. Both diffraction portions 17b, 17a are substantially concentric. The first diffraction portion 17b is formed by a circular diffraction area whose diameter is substantially φB. On the other hand, the second diffraction portion 17a is formed by a ring-shaped diffraction area which is located around the first diffraction portion 17b and whose external diameter is substantially φA. The external diameter of the first diffraction portion 17b is substantially the same as the luminous-flux diameter φB of the second luminous flux when it undergoes an aperture restriction by the aperture restriction member 5 at the time of the small numerical aperture. The external diameter of the second diffraction portion 17a is substantially the same as the luminous-flux diameter φA of the second luminous flux which is emitted from the light-emitting element 1a when it undergoes an aperture restriction by the aperture restriction member 5 at the time of the large numerical aperture.

As shown in FIG. 6, the photo-detector 18 is provided with a first detection area 18b and a second detection area 18a. The front light which has been diffracted by the first diffraction portion 17b is incident on the first detection area 18b. Then, its light spot 18d is formed in this first detection area 18b. In contrast, the front light which has been diffracted by the second diffraction portion 17a is incident on the second detection area 18a. Then, its light spot 18c is formed in this second detection area 18a.

The first detection area 18b is an area which is larger than its light spot 18d. The light which is emitted from each of both light-emitting elements 1a, 12a has a different oscillation wavelength, so that it is diffracted in a different direction by the diffraction portion 17b. Taking this into account, the first detection area 18b is large enough to receive these luminous fluxes, whichever it may be.

In this fourth embodiment, at the time of the large numerical aperture, the luminous flux 15 is emitted from the light-emitting element 1a, is transformed into a parallel luminous flux by the collimating lens 2 and is incident on the beam splitter 3. Out of the luminous flux 15, the first luminous flux (i.e., the front light) which has been reflected by the reflection surface 3a is incident on the hologram element 17. At this time of the large numerical aperture, the inner luminous flux is diffracted by the first diffraction portion 17b of the hologram element 17. In addition, the outer luminous flux is diffracted by the second diffraction portion 17a. At this time, the inner luminous flux and the outer luminous flux are each diffracted in a different direction Then, the inner luminous flux converges as its light spot 18d on the first detection area 18b of the photo-detector 18 while the outer luminous flux converges as its light spot 18c on the second detection area 18a.

On the other hand, at the time of the small numerical aperture, the luminous flux 16 is emitted from the light emitting element 12a, is transformed into a parallel luminous flux by the collimating lens 13 and is incident on the beam splitter 3. Out of the luminous flux 16, the first luminous flux (i.e., the front light) which has passed through the reflection surface 3a is incident on the hologram element 17. The inner luminous flux of this luminous flux 16 is diffracted by the diffraction portion 17b of the hologram element 17 and is detected in the first detection area 18b of the photo-detector 18. The outer luminous flux of the luminous flux 16 is diffracted by the second diffraction portion 17a and is detected in the second detection area 18a.

The electric currents which have been generated in the detection areas 18b, 18a are each converted into a voltage by the current-voltage conversion amplifiers 54a, 54b, respectively. Then, a single signal E, and an addition signal F via the summing amplifier 55a, are obtained. Then, at the time of the large numerical aperture, the addition signal F is used as a feedback signal, so that control is executed for the quantity of light which is emitted by the light-emitting element 1a. On the other hand, at the time of the small numerical aperture, the single signal E is used as a feedback signal, so that control is executed for the quantity of light which is emitted by the light-emitting element 12a. Herein, a servo signal and an RF signal are detected in the same way as in the third embodiment.

In this fourth embodiment, the inner luminous flux and the outer luminous flux of the first luminous flux which is obtained from the branching by the beam splitter 3 are separately diffracted by each diffraction portion 17b, 17a of the hologram element 17. Thereby, both luminous fluxes are split. This raises the degree of freedom of the detection-area pattern of the photo-detector 18.

Furthermore, in this fourth embodiment, the pattern of each diffraction portion 17a, 17b is formed so that the luminous flux which is diffracted by each diffraction portion 17a, 17b can converge on the detection areas 18a, 18b, respectively. This makes the photo-detector 18 smaller.

Herein, the aperture restriction member 5 may also be formed by a wavelength selection-type filter which can adjust a luminous-flux diameter based on the wavelength of a passing luminous flux. In that case, the aperture switch circuit 53 can be omitted.

The other configurations and the like are the same as those of the third embodiment.

FIFTH EMBODIMENT

Figure 8:
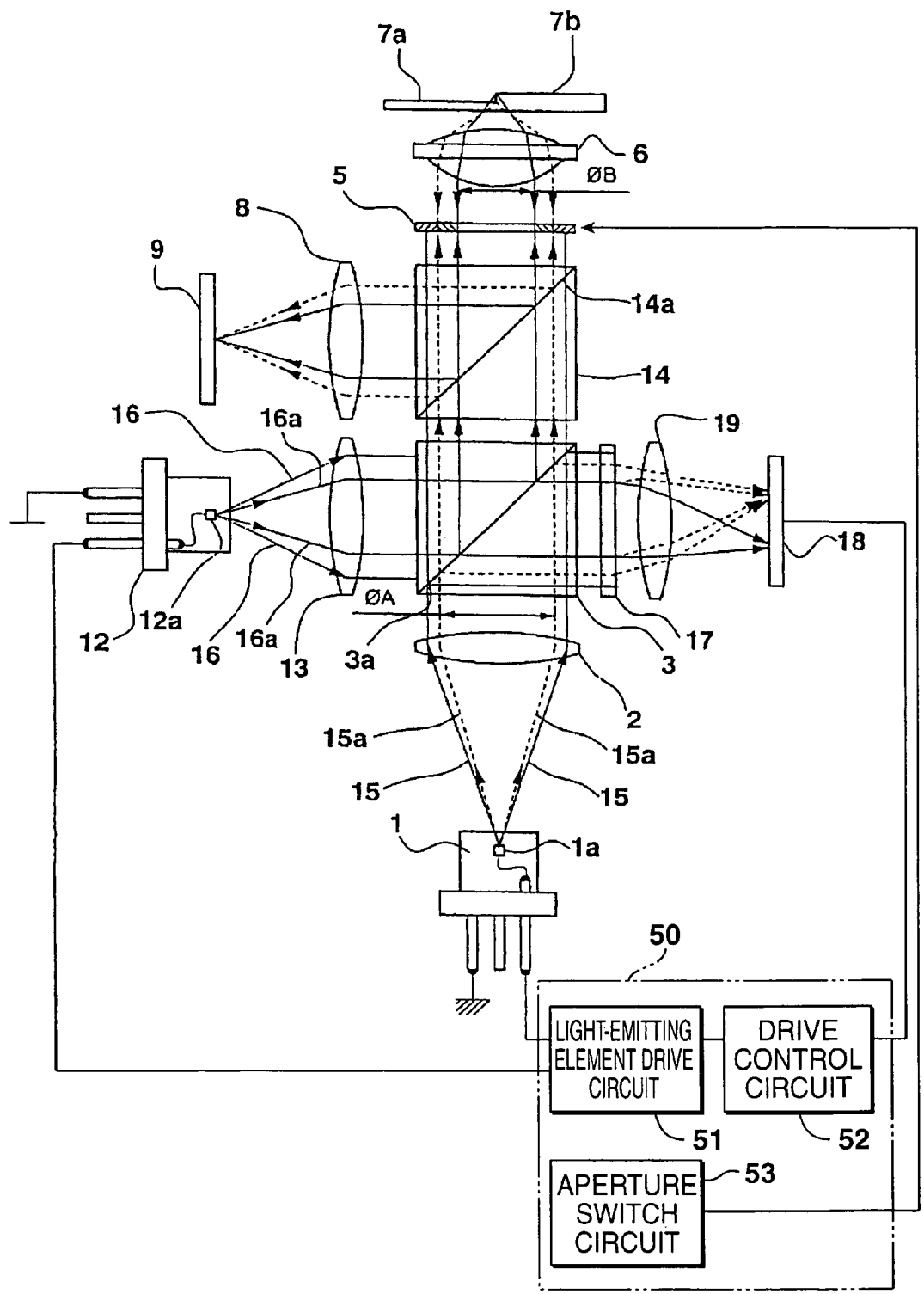
FIG. 8 is a schematic view of an optical-disk drive device according to a fifth embodiment of the present invention, showing its configuration.

FIG. 8 shows an optical-disk drive device according to a fifth embodiment of the present invention. As shown in FIG. 8, in this fifth embodiment, a light-converging lens 19 is disposed between the hologram element 17 and the photo-detector 18. This light-converging lens 19 converges the luminous flux which has emitted from the beam splitter 3 on the photo-detector 18.

In this fifth embodiment, at the time of the large numerical aperture, the luminous flux 15 is emitted from the light-emitting element 1a, passes through the collimating lens 2 and is incident on the beam splitter 3. Out of the luminous flux 15, the first luminous flux (i.e., the front light) which has been reflected by the reflection surface 3a is incident on the hologram element 17. The first luminous flux is diffracted by the diffraction portion 17a and the diffraction portion 17b of the hologram element 17. Then, it is converged as the light spots 18c, 18d on the detection areas 18a, 18b of the photo-detector 18, respectively, by the light-converging lens 19.

On the other hand, at the time of the small numerical aperture, the luminous flux 16 is emitted from the light-emitting element 12a, passes through the collimating lens 13 and is incident on the beam splitter 3. Out of the luminous flux 16, the first luminous flux which has passed through the reflection surface 3a is incident on the hologram element 17. At this time of the small numerical aperture, it is diffracted by the hologram element 17. Then, through the light-converging lens 19, it converges on the detection areas 18a, 18b of the photo-detector 18.

The electric currents which have been generated in the detection areas 18b, 18a are each converted into a voltage by the current-voltage conversion amplifiers 54a, 54b, respectively. Then, the single signal E, and the addition signal F via the summing amplifier 55a, are obtained. At the time of the large numerical aperture, the addition signal F is used as a feedback signal, while at the time of the small numerical aperture, the single signal E is used as a feedback signal. Thereby, control is executed for the power of each of the light-emitting elements 1a, 12a. Herein, a servo signal and an RF signal are detected in the same way as in the fourth embodiment.

According to this fifth embodiment, the first luminous flux is converged on the photo-detector 18 by the light-converging lens 19. Thereby, a signal can be obtained for controlling the quantity of light.

Herein, the aperture restriction member 5 may also be formed by a wavelength selection-type filter which can adjust a luminous-flux diameter based on the wavelength of a passing luminous flux. In that case, the aperture switch circuit 53 can be omitted.

The other configurations and the like are the same as those of the fourth embodiment.

SIXTH EMBODIMENT

Figure 9:
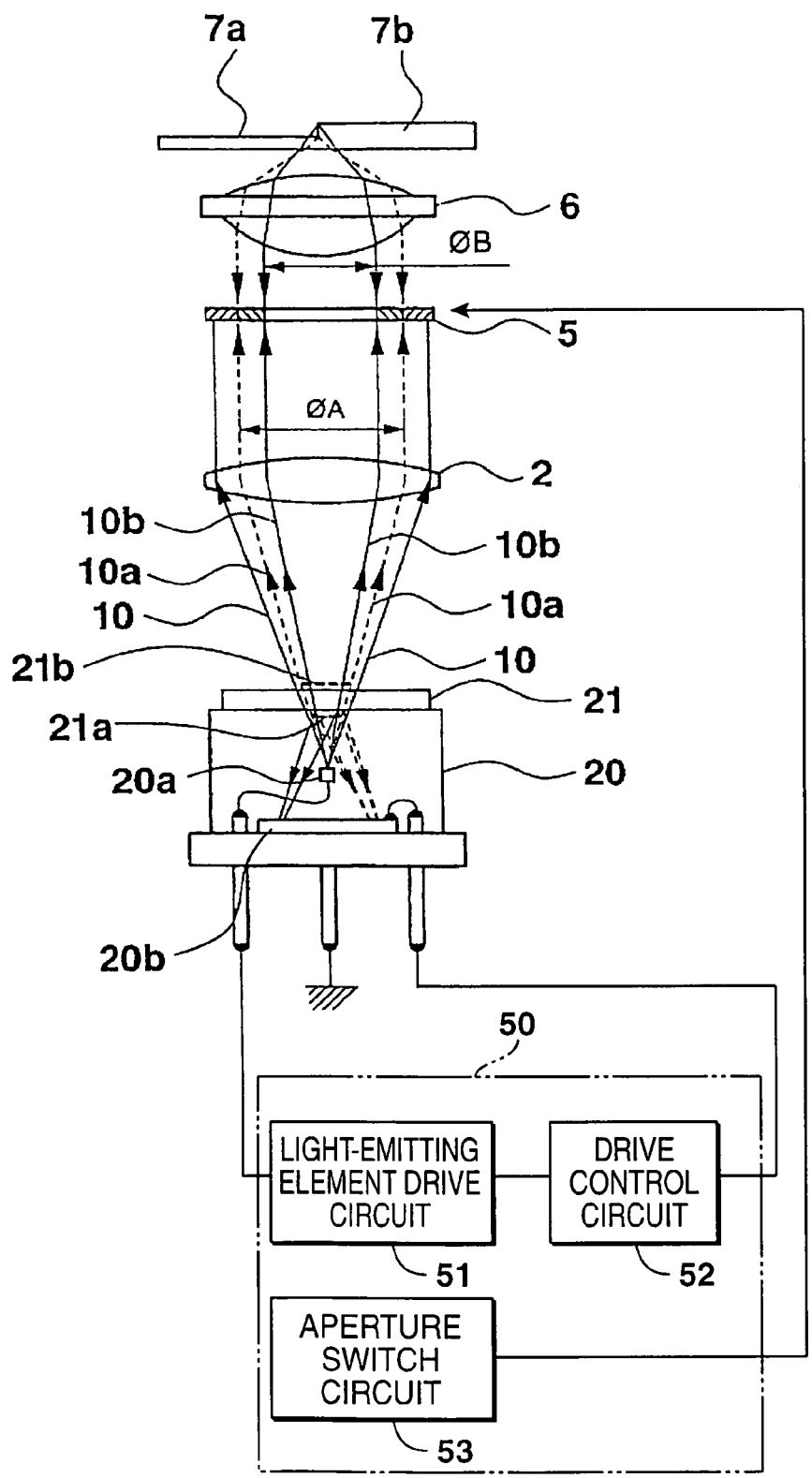
FIG. 9 is a schematic view of an optical-disk drive device according to a sixth embodiment of the present invention, showing its configuration.
Figure 10:
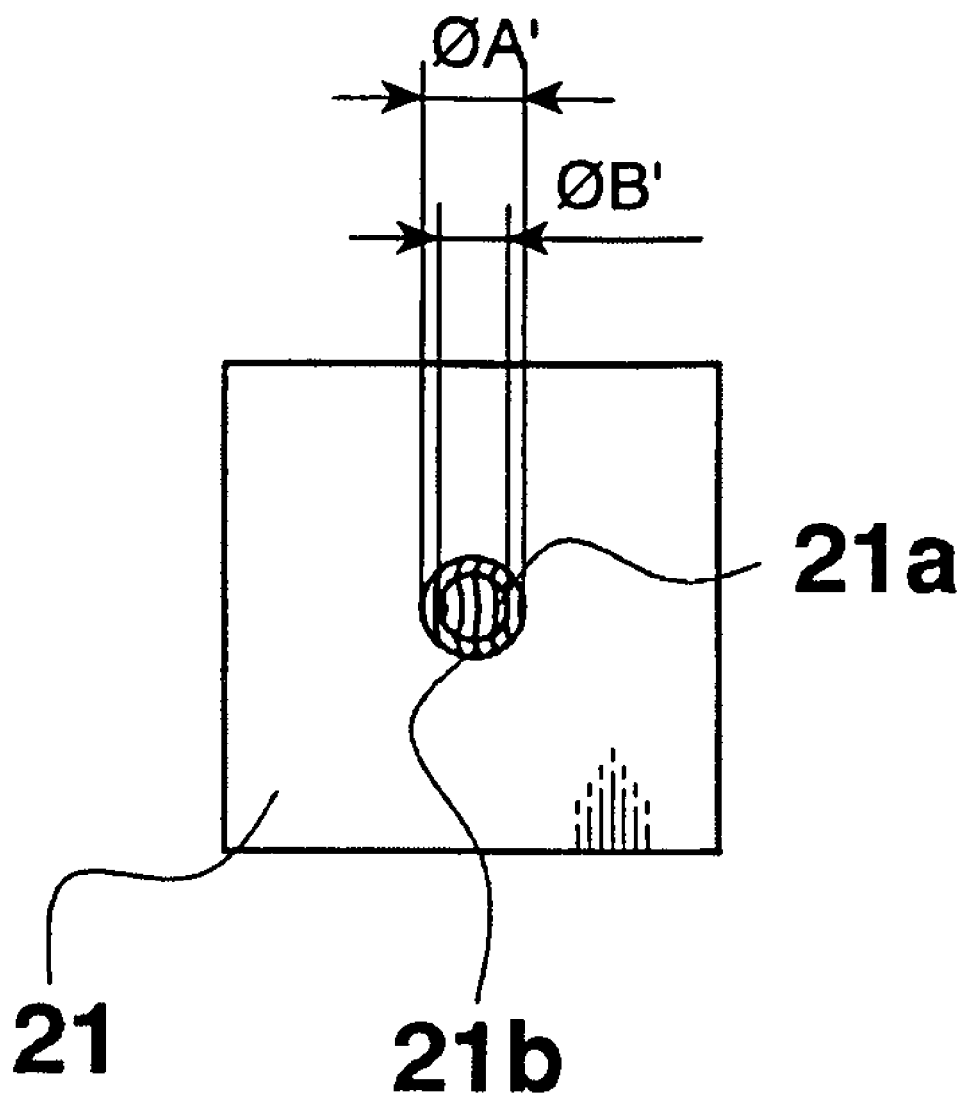
FIG. 10 is a schematic view of the hologram element which is provided in the optical-disk drive device, showing a diffraction area on it.

FIG. 9 shows an optical-disk drive device according to a sixth embodiment of the present invention. FIG. 10 shows a diffraction area which is provided in a hologram element 21.

As shown in FIG. 9, a light-emitting element 20a is disposed inside of an integrated unit 20. In this sixth embodiment, the single light-emitting element 20a is provided in the same way as in the first embodiment. A photo-detector 20b is disposed inside of the integrated unit 20. This photo-detector 20b is used to detect the front light, an RF signal and a servo signal.

The hologram element 21 is attached to the integrated unit 20. This hologram element 21 is disposed between the light-emitting element 20a and the collimating lens 2. On the upper surface of the hologram element 21, there is formed a diffraction area 21b for detecting a servo signal and for detecting an RF signal. On the lower surface (i.e., the surface upon which the light is incident from the light-emitting element 20a) of the hologram element 21, there is formed a reflection-type diffraction area 21a for detecting the front light. The external diameter $\phi A'$ of the diffraction area 21a corresponds to the diameter $\phi A$ of the luminous flux which undergoes an aperture restriction at the time of the large numerical aperture. On the other hand, The external diameter $\phi B'$ of the diffraction area 21b corresponds to the diameter $\phi B$ of the luminous flux which undergoes an aperture restriction at the time of the small numerical aperture.

In this sixth embodiment, a part of the luminous flux 10 which has been emitted from the light-emitting element 20a is diffracted and reflected by the diffraction area 21a and the diffraction area 21b. Then, it converges on the first detection area and the second detection area (not shown) on the photo-detector 20b. The electric currents which have been outputted from both detection areas are each converted into a voltage by the current-voltage conversion amplifiers 54a, 54b, respectively. Then, a signal is obtained by the summing amplifier 55a. In addition, such a signal is chosen according to whether it is the time of the large numerical aperture, or the time of the small numerical aperture. Then, the drive of the light-emitting element 20a is controlled, so that control is executed so that the power of the light-emitting element 20a is kept constant.

On the other hand, the zero-order light which has passed through the hologram element 21 is transformed into a substantially parallel beam by the collimating lens 2. Then, it undergoes an aperture restriction at the time of the large numerical aperture by the aperture restriction member 5, so that its luminous-flux diameter turns into $\phi A$. At the time of the small numerical aperture, it undergoes an aperture restriction so that its luminous-flux diameter turns into $\phi B$. This luminous flux is incident on the objective lens 6 to form a focal point on the optical disk 7a at the time of the large numerical aperture. At the time of the small numerical aperture, it forms a focal point on the optical disk 7b. Then, the luminous flux which has been reflected by each of the optical disks 7a, 7b passes again through the objective lens 6 and the aperture restriction member 5. Then, it is incident on the collimating lens 2 and converges, and it is incident on the hologram element 21. This luminous flux is diffracted by the diffraction area 21b on the surface of the hologram element 21. Then, it forms a focal point in the light-detection portion on the photo-detector 20b. Thereby, a servo signal and an RF signal are obtained.

The other configurations and the like are the same as those of the first embodiment.

SEVENTH EMBODIMENT

Figure 11:
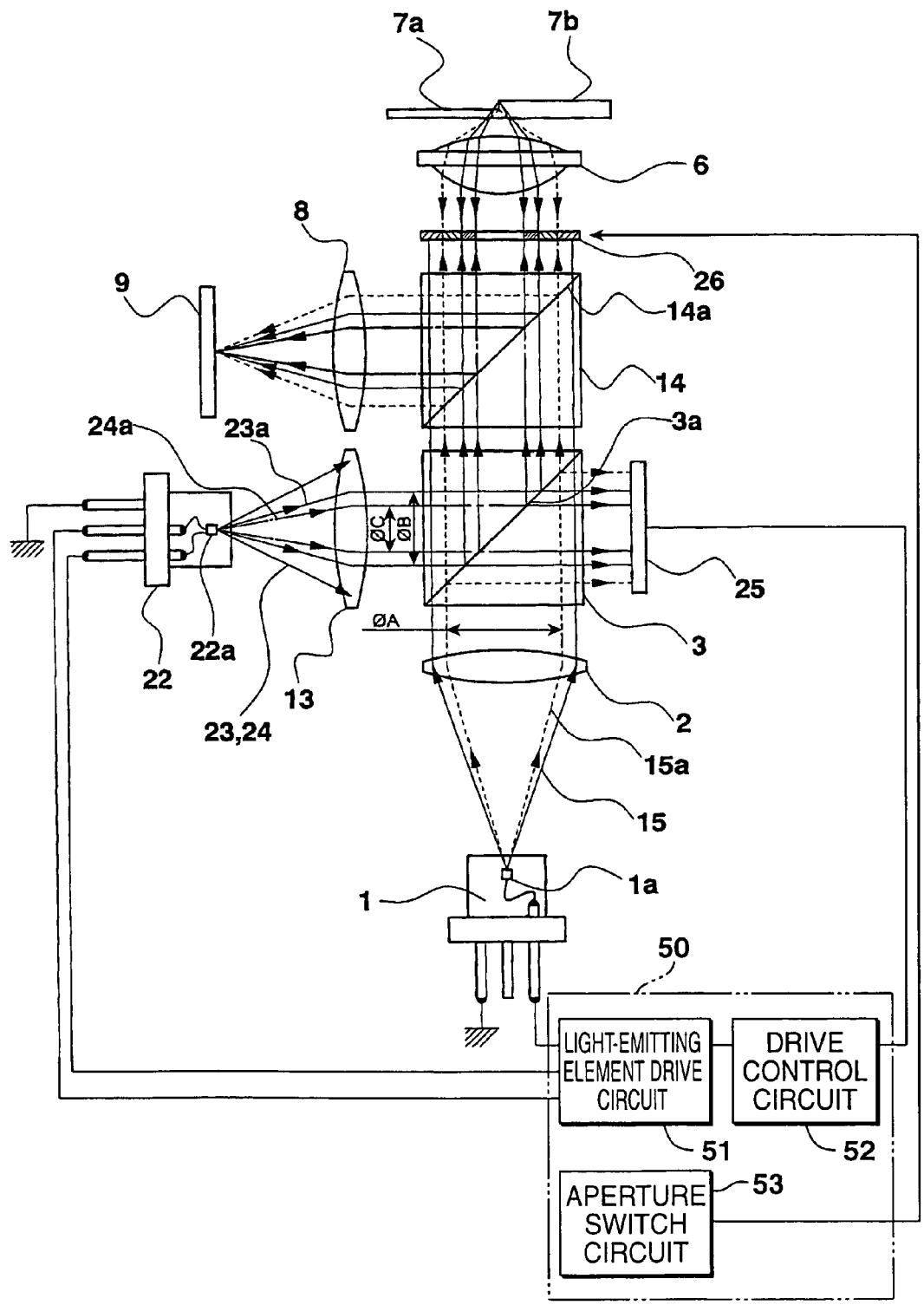
FIG. 11 is a schematic view of an optical-disk drive device according to a seventh embodiment of the present invention, showing its configuration.

FIG. 11 shows an optical-disk drive device according to a seventh embodiment of the present invention. As shown in FIG. 11, in this seventh embodiment, a light-emitting element 22a which is housed in a package 22 emits two kinds of beams of light which are each different in wavelength from each other. This light-emitting element 22a is provided with two chips which each emit mutually-different wavelength light. However, they are too closely disposed, and thus, they are shown for convenience in FIG. 11 as if both of them would emit light from the same position.

The light-emitting element 1a emits the luminous flux 15 which has a wavelength of 405 nm, while the light-emitting element 22a emits a luminous flux 24 which has a wavelength of 790 nm and a luminous flux 23 which has a wavelength of 650 nm. Herein, the light-emitting element 1a and the light-emitting element 22a are not driven at the same time. Only either of them is driven to emit light. Besides, the light-emitting element 22a does not simultaneously emit the 790-nm wavelength luminous flux 24 and the 650-nm wavelength luminous flux 23. It emits either of them.

An aperture restriction member 26 places an aperture restriction on a passing luminous flux. This aperture restriction member 26 can execute an aperture restriction according to three kinds of diameters of $\phi A$, $\phi B$, $\phi C$. The aperture restriction member 26 switches an aperture state, for example, by applying a voltage to a liquid-crystal element.

Figure 12:
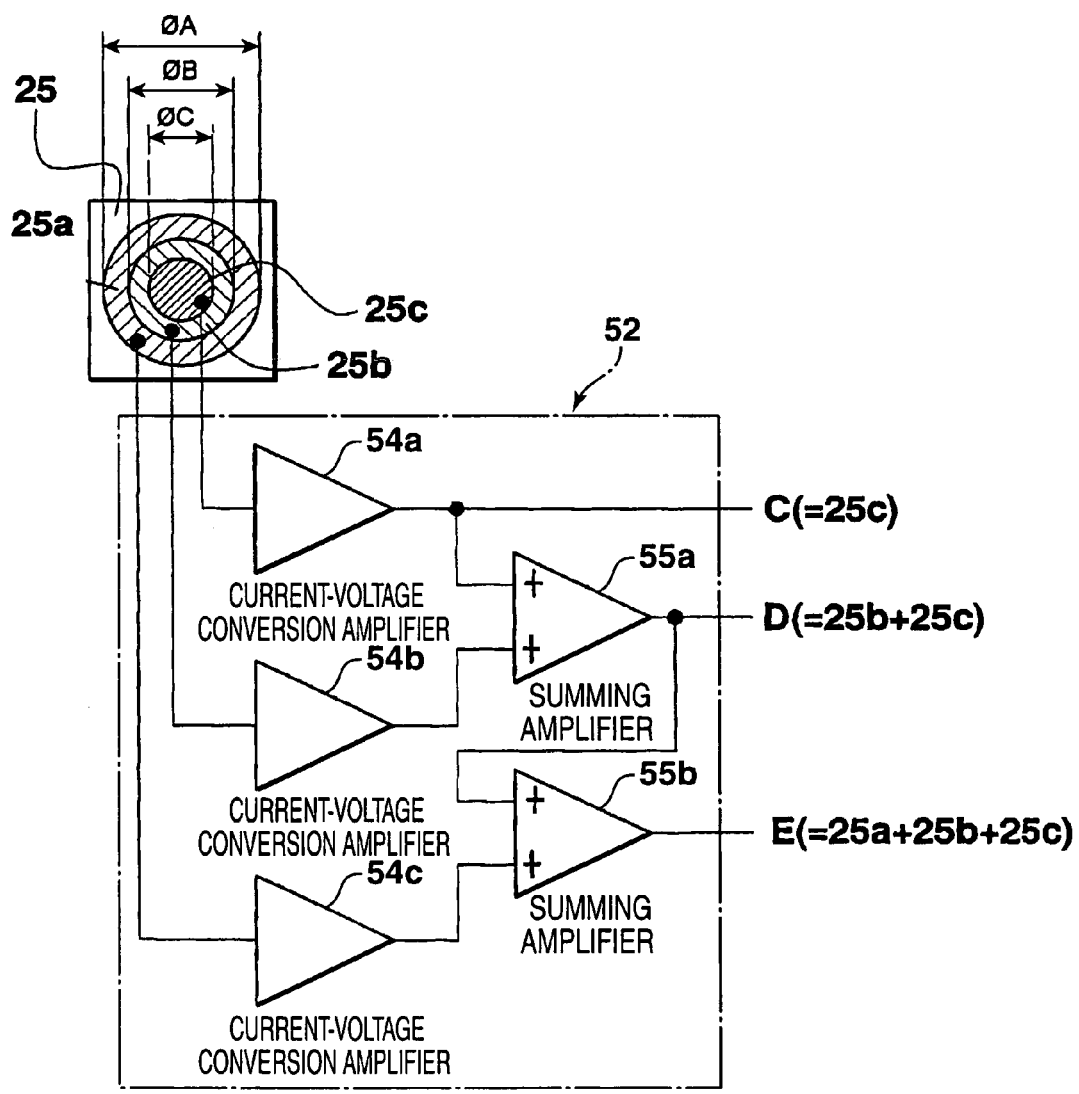
FIG. 12 is a circuit diagram of the photo-detector and the drive control circuit which are provided in the optical-disk drive device.

The luminous fluxes 23, 24 which have been emitted from the light-emitting element 22a each pass through the reflection surface 3a of the beam splitter 3. Then, they are incident on a photo-detector 25 as the first detector. As shown in FIG. 12, in this photo-detector 25, three detection areas are formed which are disposed concentric with each other. Around a first detection area 25c, a second detection area 25b is formed, and around it, there is formed a third detection area 25a. The first detection area 25c is a circular area which has substantially the same diameter as the small luminous-flux diameter $\phi C$. The second detection area 25b is a ring-shaped area whose internal diameter is $\phi C$ and whose external diameter is the middle luminous-flux diameter $\phi B$. The third detection area 25a is a ring-shaped area whose internal diameter is $\phi B$ and whose external diameter is the large luminous-flux diameter $\phi A$. The first detection area 25c receives an inner luminous flux, the third detection area 25a receives an outermost luminous flux, and the second detection area 25b receives an outer luminous flux between the inner luminous flux and the outermost luminous flux.

The aperture switch circuit 53 of the controller 50 allows the light-emitting elements 1a, 22a to emit light at each wavelength. Then, it detects the reflectance, the type, amplitude and frequency of a signal, or the like, of an optical disk which is mounted at that time. Thereby, it identifies the optical disk. Then, based on that, it allows the aperture restriction member 26 to switch an aperture restriction. In addition, it chooses which of the light-emitting elements 1a, 22a should be used.

The drive control circuit 52 includes three current-voltage conversion amplifiers 54a, 54b, 54c, and two summing amplifiers 55a, 55b. It can execute switching among a first control state, a second control state and a third control state. In the first control state, a control signal is outputted according to the quantity of light which is received in the first detection area 25c. In the second control state, a control signal is outputted according to the received-light quantity which is obtained by adding the quantity of light which is received in the first detection area 25c and the quantity of light which is received in the second detection area 25b. In the third control state, a control signal is outputted according to the total received-light quantity which is obtained by adding the quantity of light which is received in the first detection area 25c, the quantity of light which is received in the second detection area 25b and the quantity of light which is received in the third detection area 25a.

In this seventh embodiment, when an aperture restriction is placed on a luminous flux so that its diameter turns into φA, or at the time of the large numerical aperture, the drive control circuit 52 of the controller 50 becomes the third control state. At this time of the large numerical aperture, the light-emitting element 1a emits light. The light which has been emitted from the light-emitting element 1a and has been reflected by the reflection surface 3a of the beam splitter 3 is detected by the photo-detector 25. The light which has passed through the reflection surface 3a is detected by the photo-detector 9 in the same way as in the third embodiment.

The photo-detector 25 receives the light which has been emitted from the light-emitting element 1a, in the total area of the first detection area 25c, the second detection area 25b and the third detection area 25a. Then, a signal which is outputted from each detection area 25c, 25b, 25a is inputted via the current-voltage conversion amplifiers 54a, 54b, 54c, respectively, in the summing amplifiers 55a, 55b. They are outputted as an addition signal E of all the detection areas 25c, 25b, 25a. According to this addition signal E, control is executed so that the power of the light-emitting element 1a is kept constant.

In contrast, when an aperture restriction is placed on a luminous flux so that its diameter turns into φB, or at the time of the middle numerical aperture, the drive control circuit 52 of the controller 50 becomes the second control state. At this time of the middle numerical aperture, the light-emitting element 22a emits light. This light is the light which has the second shortest wavelength among three kinds of wavelengths. It is the shorter wavelength light which is emitted from the light-emitting element 22a. The light which has been emitted from the light-emitting element 22a and has passed through the reflection surface 3a of the beam splitter 3 is detected by the photo-detector 25. The light which has been reflected by the reflection surface 3a is detected by the photo-detector 9 in the same way as in the third embodiment.

In the photo-detector 25, a signal which is outputted from each detection area 25c, 25b is inputted via the current-voltage conversion amplifiers 54a, 54b, respectively, in the summing amplifier 55a. Then, they are outputted as an addition signal D. According to this addition signal D, control is executed so that the power of the light-emitting element 22a is kept constant.

On the other hand, when an aperture restriction is placed on a luminous flux so that its diameter turns into φC, or at the time of the small numerical aperture, the drive control circuit 52 of the controller 50 becomes the first control state. At this time of the small numerical aperture, the light-emitting element 22a emits light. This light is the longer wavelength light which is emitted from the light-emitting element 22a. The light which has been emitted from the light-emitting element 22a and has passed through the reflection surface 3a of the beam splitter 3 is detected by the photo-detector 25. The light which has been reflected by the reflection surface 3a is detected by the photo-detector 9 in the same way as in the third embodiment.

In the photo-detector 25, a signal which is outputted from the first detection area 25c is outputted as a single signal C via the current-voltage conversion amplifier 54a. Then, according to this single signal C, control is executed so that the power of the light-emitting element 22a is kept constant.

The other configurations and the like are the same as those of the third embodiment.

EIGHTH EMBODIMENT

Figure 13:
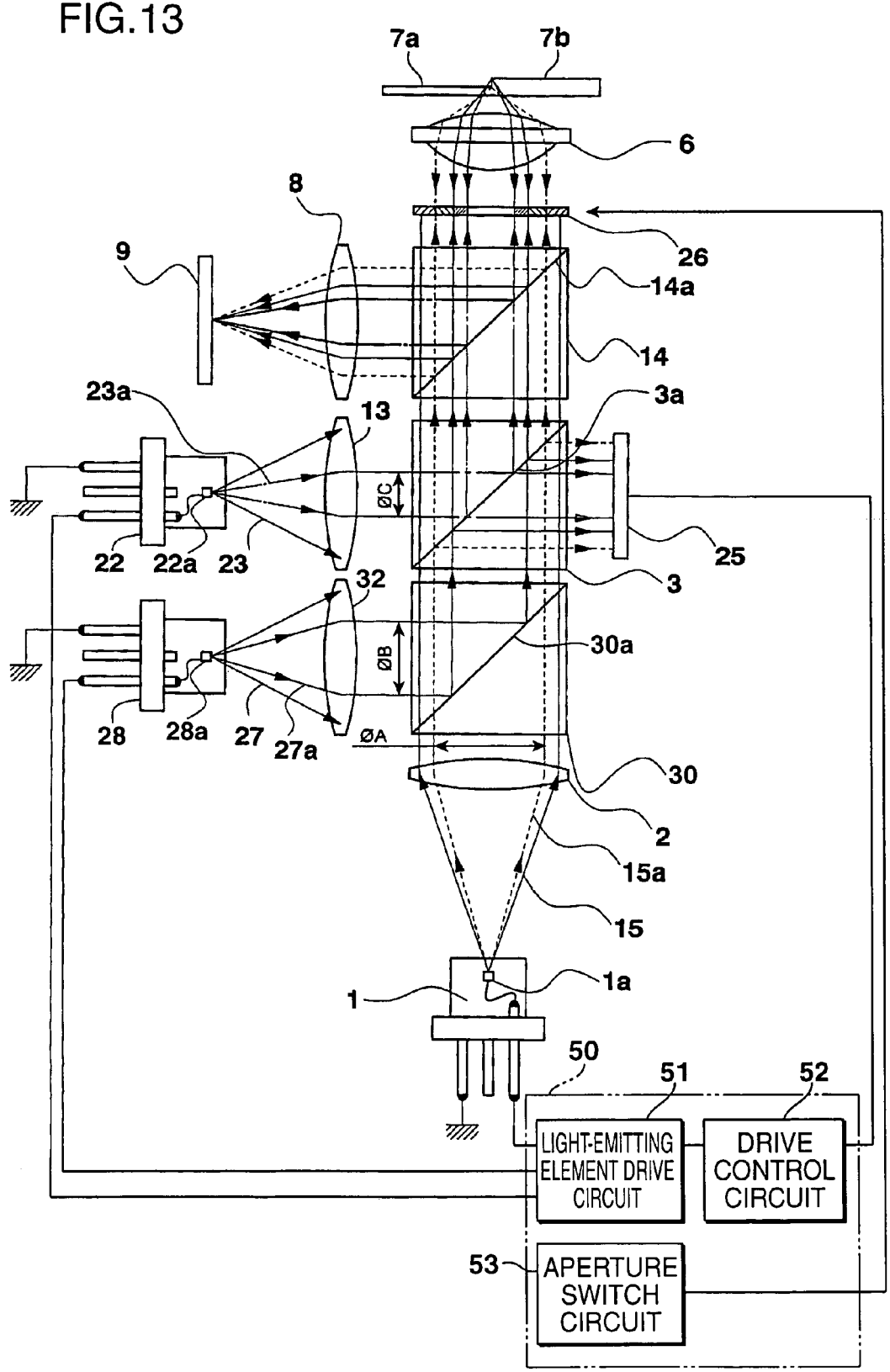
FIG. 13 is a schematic view of an optical-disk drive device according to an eighth embodiment of the present invention, showing its configuration.

FIG. 13 shows an optical-disk drive device according to an eighth embodiment of the present invention. As shown in FIG. 13, in this eighth embodiment, three light-emitting elements 1a, 22a, 28a are each disposed in a separate package 1, 22, 28. The light-emitting element 1a emits the luminous flux 15 which has a wavelength of 405 nm, the light-emitting element 22a emits a luminous flux 23 which has a wavelength of 790 nm, and the light-emitting element 28a emits a luminous flux 27 which has a wavelength of 650 nm. These light-emitting elements 1a, 22a, 28a are not driven at the same time. Only any one of them is chosen and driven.

A beam splitter 30 is disposed between the collimating lens 2 and the beam splitter 3. Between this beam splitter 30 and the light-emitting element 28a, there is disposed a collimating lens 32. This collimating lens 32 transforms, into a parallel luminous flux, the luminous flux 27 which is emitted from the light-emitting element 28a and goes toward the beam splitter 30.

The beam splitter 30 transmits the luminous flux 15 which is emitted from the light-emitting element 1a. On the other hand, it has a reflection surface 30a which reflects, at a reflection angle of 45 degrees, the luminous flux 27 which is emitted from the light-emitting element 28a.

In this eighth embodiment, at the time of the large numerical aperture, the light-emitting element 1a emits the luminous flux 15. This luminous flux 15 passes through the collimating lens 2 and the reflection surface 30a of the beam splitter 30. Thereafter, it branches off at the reflection surface 3a of the beam splitter 3.

At the time of the middle numerical aperture, the light-emitting element 28a emits the luminous flux 27. This luminous flux 27 passes through the collimating lens 32 and is reflected by the reflection surface 30a of the beam splitter 30. Then, it is incident on the beam splitter 3. This luminous flux 27 branches off at the reflection surface 3a.

At the time of the small numerical aperture, the light-emitting element 22a emits the luminous flux 23. This luminous flux 23 passes through the collimating lens 13 and is incident on the beam splitter 3. Then, this luminous flux 23 branches off at the reflection surface 3a.

Whichever it may be, the time of the large numerical aperture, the time of the middle numerical aperture and the time of the small numerical aperture, the luminous fluxes 15, 27, 23 which have branched off at the beam splitter 3 will take the same courses as those of the seventh embodiment. The other configurations and the like are the same as those of the seventh embodiment.

NINTH EMBODIMENT

FIG. 14 shows an optical-disk drive device according to a ninth embodiment of the present invention. As shown in FIG. 14, in this ninth embodiment, an aperture restriction member 34 is disposed between the beam splitter 3 and the photo-detector 4.

The aperture restriction member 34 places an aperture restriction on the first luminous flux which branches off at the beam splitter 3. This aperture restriction member 34 is formed by a wavelength selection-type filter which can adjust a luminous-flux diameter based on the wavelength of a passing luminous flux. Specifically, when the luminous flux 10 which has been emitted from the light-emitting element 1a-passes through, the aperture restriction member 34 screens out its peripheral part so that a luminous flux with a diameter of ϕA passes through (i.e., the second aperture state). On the other hand, when the luminous flux 11 which has been emitted from the light-emitting element 1b passes through, the aperture restriction member 34 screens out its peripheral part so that a luminous flux with a diameter of ϕB passes through (i.e., the first aperture state).

Herein, the aperture restriction member 34 is not limited to such a wavelength selection-type filter. For example, it may also be configured so that the voltage which is applied to a liquid-crystal element is controlled, and thereby, switching is executed from the first aperture state to the second aperture state, and vice versa. Or, it may also be configured so that the aperture state is switched by a light-shielding member which has an aperture part whose internal diameter can be varied. Or, it may also be configured so that a light-shielding member with several aperture parts whose internal diameters are each different is brought in and taken out. In short, the aperture restriction member 34 may be variously configured, as long as switching can be executed from the first aperture state to the second aperture state, and vice versa. The other configurations and the like are the same as those of the second embodiment.

This application is based on Japanese patent application serial No. 2004-039399, filed in Japan Patent Office on Feb. 17, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical-disk drive device which operates at a numerical aperture that corresponds to each of a plurality of optical disks, comprising:
    a light source;
    a branching element which allows a luminous flux that is emitted from said light source to branch off to a first luminous flux and a second luminous flux;
    a first detector which receives the first luminous flux that is obtained from the branching by said branching element;
    a controller which controls the quantity of light that is emitted by said light source, according to the quantity of light that is received by said first detector; and
    a second detector which receives the second luminous flux after the second luminous flux is reflected by an optical disk, wherein:
    said first detector includes a first detection area in which an inner luminous flux of the first luminous flux is received, and at least one second detection area in which an outer luminous flux of the first luminous flux is received; and
    said controller switches, from a first control state in which the quantity of light that is emitted by said light source is controlled based on the quantity of light that is received in said first detection area, to a second control state in which the quantity of light that is emitted by said light source is controlled based on the quantity of light that is received in said first detection area and said second detection area, and vice versa.

2. The optical-disk drive device according to claim 1, wherein:
    between said branching element and the optical disk, an aperture restriction member is provided which the second luminous flux which is obtained from the branching by said branching element passes through; and
    said aperture restriction member switches, at least, from a first aperture state, to a second aperture state in which the diameter thereof is wider than that in the first aperture state so that the second luminous flux passes through, and vice versa.

3. The optical-disk drive device according to claim 2, wherein:
    between said light source and said branching element, a collimating lens is provided which transforms, into a parallel luminous flux, a luminous flux that goes toward said branching element from said light source;
    said first detection area is circular whose diameter is substantially the same as that of the second luminous flux that passes through said aperture restriction member in the first aperture state; and
    said second detection area is located around said first detection area and has a ring shape whose external diameter is substantially the same as that of the second luminous flux that passes through said aperture restriction member in the second aperture state.

4. The optical-disk drive device according to claim 3, wherein:
    said aperture restriction member executes an aperture restriction operation for adjusting the luminous-flux diameter of the second luminous flux; and
    said controller switches from the first control state to the second control state, and vice versa, in connection with the aperture restriction operation of said aperture restriction member.

5. The optical-disk drive device according to claim 2, wherein said first detection area and said second detection area are concentric with each other.

6. The optical-disk drive device according to claim 2, wherein:

between said branching element and said first detector, an aperture restriction member is provided which the first luminous flux which is obtained from the branching by said branching element passes through; and said aperture restriction member switches, at least, from a first aperture state, to a second aperture state in which a luminous flux passes through whose diameter is substantially the same as that of the second luminous flux whose diameter is wider than that of the first aperture state, and vice versa.

7. The optical-disk drive device according to claim 1, wherein:

as said light source, a plurality of light sources are provided which emit light with a different wavelength from each other;

between said branching element and the optical disk, an aperture restriction member is provided which the second luminous flux which is obtained from the branching by said branching element passes through;

said aperture restriction member is formed by a filter which adjusts the luminous-flux diameter of the passing second luminous flux, based on the wavelength of the second luminous flux; and said controller switches the control state according to which of said light sources emits light.

8. The optical-disk drive device according to claim 1, wherein:

as said light source, a plurality of light sources are provided which emit light with a different wave-length from each other; and said controller switches the control state according to which of said light sources emits light.

9. The optical-disk drive device according to claim 8, wherein:

as said light source, there are provided a first light source and a second light source which emits light with a shorter wavelength than that of said first light source;

said first detection area receiving the first luminous flux which is emitted from said first light source and is obtained from the branching by said branching element; and said second detection area receiving the first luminous flux which is emitted from said second light source and is obtained from the branching by said branching element.

10. The optical-disk drive device according to claim 9, wherein the numerical apertures are set at any two of approximately 0.45, approximately 0.6 and approximately 0.85.

11. The optical-disk drive device according to claim 8, wherein:

as said light source, there are provided a first light source, a second light source which emits light with a shorter wavelength than that of said first light source, and a third light source which emits light with a shorter wavelength than that of said second light source;

said first detector includes a first detection area in which an inner luminous flux of the first luminous flux is received, a second detection area in which an outer luminous flux of the first luminous flux is received, and a third detection area in which an outermost luminous flux of the first luminous flux is received; and said controller switches among a first control state in which the quantity of light that is emitted by said first light source is controlled based on the quantity of light that is received in said first detection area, a second control state in which the quantity of light that is emitted by said second light source is controlled based on the quantity of light that is received in said first detection area and said second detection area, and a third control state in which the quantity of light that is emitted by said third light source is controlled based on the total quantity of light that is received in said first detection area, said second detection area and said third detection area.

12. The optical-disk drive device according to claim 11, wherein the numerical apertures are set at approximately 0.45, approximately 0.6 and approximately 0.85.

13. The optical-disk drive device according to claim 8, wherein said plurality of light sources are each disposed in a separate package.

14. The optical-disk drive device according to claim 1, wherein:

a diffractive element is provided between said branching element and said first detector; and said diffractive element includes a first diffraction portion which diffracts the inner luminous flux toward said first detection area, and a second diffraction portion which diffracts the outer luminous flux toward said second detection area.

15. The optical-disk drive device according to claim 14, wherein a light-converging element is provided between said diffractive element and said first detector.

16. The optical-disk drive device according to claim 1, wherein said branching element is formed by a hologram element.

* * * * *

UNITED STATES PATENT AND TRADEMARK OFFICE
CERTIFICATE OF CORRECTION

PATENT NO.        : 7,349,320 B2  
APPLICATION NO.   : 11/059700  
DATED             : March 25, 2008  
INVENTOR(S)       : Makoto Takashima et al.

Page 1 of 1

It is certified that error appears in the above-identified patent and that said Letters Patent is hereby corrected as shown below:

ON THE TITLE PAGE

On the Title page, left column, Item (54), line 1, please change "Apparatus for Switching Modes Based on Quantity of Light Received in First Section of a Photodetector Section and First plus Second Section for Controlling a Laser Diode Output" to --An Apparatus for Switching Modes Based on Quantity of Light Received in First Section of a Photodetector Section and First plus Second Section for Controlling a Laser Diode Output--.

Signed and Sealed this

Nineteenth Day of August, 2008

JON W. DUDAS  
*Director of the United States Patent and Trademark Office*

UNITED STATES PATENT AND TRADEMARK OFFICE
CERTIFICATE OF CORRECTION

| | |
|---|---|
| PATENT NO. | : 7,349,320 B2 |
| APPLICATION NO. | : 11/059700 |
| DATED | : March 25, 2008 |
| INVENTOR(S) | : Makoto Takashima et al. |

It is certified that error appears in the above-identified patent and that said Letters Patent is hereby corrected as shown below:

ON THE TITLE PAGE

On the Title page, left column, Item (54), line 1, and Column 1, lines 1-6, please change "Apparatus for Switching Modes Based on Quantity of Light Received in First Section of a Photodetector Section and First plus Second Section for Controlling a Laser Diode Output" to --An Apparatus for Switching Modes Based on Quantity of Light Received in First Section of a Photodetector Section and First plus Second Section for Controlling a Laser Diode Output--.

This certificate supersedes the Certificate of Correction issued August 19, 2008.

Signed and Sealed this

Sixteenth Day of September, 2008

JON W. DUDAS
*Director of the United States Patent and Trademark Office*